US012340651B2

(12) United States Patent
Perrow

(10) Patent No.: US 12,340,651 B2
(45) Date of Patent: Jun. 24, 2025

(54) CONTROLLER DEVICE FOR VARIABLY CONTROLLING GAME FEATURES, ELEMENTS AND OPERATIONS IN ELECTRONIC GAMING MACHINES AND SYSTEMS

(71) Applicant: Aristocrat Technologies Australia Pty Limited, North Ryde (AU)

(72) Inventor: Shane Perrow, Kembla Heights (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 317 days.

(21) Appl. No.: 18/112,677

(22) Filed: Feb. 22, 2023

(65) Prior Publication Data

US 2023/0316851 A1 Oct. 5, 2023

Related U.S. Application Data

(60) Provisional application No. 63/326,212, filed on Mar. 31, 2022.

(51) Int. Cl.
*G07F 17/00* (2006.01)
*G07F 17/32* (2006.01)

(52) U.S. Cl.
CPC ...... *G07F 17/3213* (2013.01); *G07F 17/3209* (2013.01)

(58) Field of Classification Search
None
See application file for complete search history.

(56) References Cited

U.S. PATENT DOCUMENTS 4,358,114 A * 11/1982 Burnside ............. G07F 17/3213 273/143 R
4,373,727 A 2/1983 Hooker
4,430,903 A * 2/1984 Hooker ............... G07F 17/3213 74/114
4,433,844 A * 2/1984 Hooker ................... G07F 17/34 273/138.2
5,251,898 A * 10/1993 Dickenson .............. G07F 17/34 273/143 R
6,315,663 B1 * 11/2001 Sakamoto ........... G07F 17/3265 463/20
7,789,756 B2 * 9/2010 Jones .................. G07F 17/3213 463/19
8,192,281 B2 6/2012 Williams
8,430,742 B1 * 4/2013 Okada ................. G07F 17/3209 463/43
9,183,703 B2 * 11/2015 Yoshizawa .............. G07F 17/32
9,478,107 B2 * 10/2016 Nakamura .......... G07F 17/3213
10,304,280 B1 * 5/2019 Halvorson .......... G07F 17/3269
2004/0036218 A1 * 2/2004 Inoue ...................... G07F 17/34 463/20
2006/0046830 A1 * 3/2006 Webb .................. G07F 17/3213 463/20
2006/0281525 A1 * 12/2006 Borissov ............. G07F 17/3265 463/20

(Continued)

*Primary Examiner* — Paul A D'Agostino
(74) *Attorney, Agent, or Firm* — Weaver Austin Villeneuve & Sampson LLP

(57) ABSTRACT

An electronic gaming device having a reel that spins synchronously with a movement of an input when the input leaves a home position. The reel spins asynchronously when the input arrives at a spin position from the home position.

20 Claims, 21 Drawing Sheets

(56) References Cited

U.S. PATENT DOCUMENTS

| | | | | |
|---|---|---|---|---|
| 2010/0022294 | A1* | 1/2010 | Yoshizawa | G07F 17/34 463/20 |
| 2011/0136562 | A1* | 6/2011 | Loat | G07F 17/3267 463/20 |
| 2012/0309488 | A1* | 12/2012 | Yoshikawa | G07F 17/3213 463/20 |
| 2014/0004924 | A1* | 1/2014 | Lerias, III | G07F 17/326 463/20 |
| 2014/0094310 | A1* | 4/2014 | Bleich | G07F 17/3209 463/38 |
| 2014/0141880 | A1* | 5/2014 | Munakata | G07F 17/34 463/31 |
| 2015/0287287 | A1* | 10/2015 | Itagaki | G07F 17/323 463/20 |
| 2016/0049038 | A1* | 2/2016 | Nakamura | G07F 17/3267 463/20 |
| 2016/0125688 | A1* | 5/2016 | Hoffman | G07F 17/34 463/20 |
| 2018/0286173 | A1* | 10/2018 | Sugiyama | G07F 17/3213 |
| 2019/0244488 | A1* | 8/2019 | Marsh | G07F 17/3258 |
| 2020/0250923 | A1* | 8/2020 | Ceniceroz | G09G 3/20 |
| 2025/0037535 | A1* | 1/2025 | Chen | G07F 17/3213 |

* cited by examiner

CONTROLLER DEVICE FOR VARIABLY CONTROLLING GAME FEATURES, ELEMENTS AND OPERATIONS IN ELECTRONIC GAMING MACHINES AND SYSTEMS

RELATED APPLICATION

The present application is a continuation of and claims priority to U.S. Patent Application No. 63/326,212, filed Mar. 31, 2022, and entitled "Controller Device for Variably Controlling Game Features, Elements and Operations in Electronic Gaming Machines and Systems" which is hereby incorporated by reference in its entirety.

BACKGROUND

Electronic gaming machines or gaming devices provide a variety of wagering games such as slot games, video poker games, video blackjack games, roulette games, video bingo games, keno games and other types of games that are frequently offered at casinos and other locations. Play on electronic gaming machines ("EGMs") typically involves a player establishing a credit balance by inputting money, or another form of monetary credit, and placing a monetary wager (from the credit balance) on one or more outcomes of an instance (or single play) of a primary or base game.

In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Gaming machines or devices may employ a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

To initiate games on gaming machines, a game machine actuator may actuate (e.g., pressed, pivoted, pulled, etc.) to operate or otherwise activate functions from a non-operating state within a game. Activating an actuator generates, processes and/or transmits an electrical signal. The electrical signal is generated, processed and/or transmitted to a gaming machine to which the game machine actuator connects. The gaming machine controller operates the game at least in part based on the electrical signal it receives from the game machine actuator.

Current game machine have handles that provide simple functionality. That is, such handles have a home position and a spin detection position to actuate a game action (e.g., pulling a machine handle to spin all of the reels). Such simple functionality restricts a player's control, even just a perception of control, of gaming activities or manipulation of game elements during game operation.

Further limitations and disadvantages of conventional and traditional approaches will become apparent to one of skill in the art, through comparison of such systems and devices with some aspects of the present disclosure as set forth in the remainder of the present application with reference to the drawings.

SUMMARY

In an implementation, a gaming system or gaming device comprises a controller device that allows the player or players to variably and at intermediate control positions control game element, feature and/or gaming session. The controller device may have one or multiple inputs (e.g., a pull lever, a button(s), a thumb stick(s), a directional pad(s), a paddle(s), dials, slides, etc.). By way of example, an implementation of the controller device allows a player or players to move the controller device in a first direction (e.g., forward), in a second direction (e.g., backward) and/or in other directions after leaving the start position but before a spin signal is triggered. As the player moves the controller device, a game element, feature and/or gaming session (e.g., a reel or reels) may move to follow or the track the controller device movements (i.e., forward and backward, left or right, or fast or slow) synchronously or concurrently. When the player has decided to actuate a game element, feature and/or gaming session (e.g., the reels) for game play or upon a predetermined condition during manipulation of the controller device, the player or game controller may initiate the designated action (e.g., if by the player, pull the lever all the way to a spin position or press a button on the end of a lever ball to start the spin) that will actuate the game (e.g., spin the reels).

Such a controller device can be employed in communal game wheel spin scenarios. That is, the player or players could move the smart control device in a first direction (e.g., forward), in a second direction (e.g., backward) and/or in other directions to control game play after leaving the start position by one or more players while the communal wheel follows the movement(s) of designated smart control device(s). Once the player or players decide to actuate the communal wheel or upon reaching a predetermined condition during manipulation of the controller device, the player or game controller may initiate the designated action (e.g., to spin the communal wheel).

Such exemplary scenarios provide the player or players with added game operational and/or game element control and at least the real perception of more skilled control of the game operation, features or elements (e.g., a reel or a wheel), for example. The illustrated controller devices provide precise position information to the game controller to conduct a variety of game operations, features or elements (e.g., a reel or a wheel), and provides the ability to fine tune game features or elements, e.g., positions or operations, that could further facilitate skilled-based activities and/or games.

In some embodiments, the instant disclosure provides an electronic gaming device that includes an input being movable between a first input position and a second input position, an encoder coupled to the input and operable to detect a displacement of the input from the first input position, a display device operable to display a reel having a plurality of symbol positions, the reel being controllably moveable in a first direction and a second direction, and a first symbol position of the plurality of symbol positions being associated with the first input position, and a controller having a processor and memory storing a plurality of instructions. When the instructions are executed, the processor at least receives from the encoder a first signal indicative of a first input displacement of the input from the first input position toward the second input position. Responsive to receiving the first signal, the processor controls the display device to animate a movement of the reel in the first direction displacing the first symbol position while synchronously tracking the first input displacement. The processor also receives from the encoder a second signal indicative of a second input displacement of the input subsequent to the first input displacement reaching the second input position, and responsive to receiving the second signal, controls the display device to animate a spinning of the reel in the first direction asynchronously with the second input displacement.

In some aspects, the input includes at least one of a button, a thumb stick, a directional pad, a touch pad, a paddle handle, an arm, a dial, a slide, and a lever.

In other aspects, the input includes a variable position lever having one of multi-directional movements, multi-axis movements, multi-directional single-axis movements, and multi-directional multi-axis movements.

In some aspects, the first signal includes at least one of a position, a direction, a velocity, an absolute value, a relative value, and an incremental value of the first input displacement.

In other aspects, the encoder is operable to sense at least one of a rotational angle and linear displacement of the input.

In some aspects, the movement is a first movement, and the processor animates a second movement of the reel opposite the first movement when the input moves from an intermediate position between the first input position and the second input position back toward the first input position before reaching the second input position. In some aspects, the processor also controls the display device to animate the second movement synchronously tracking the input.

In some embodiments, the instant disclosure provides a method of controlling spinning of a reel in an electronic gaming device. The electronic gaming device includes an input being movable between a first input position and a second input position, an encoder coupled to the input and operable to detect a displacement of the input from the first input position, a display device operable to display a reel having a plurality of symbol positions, the reel being controllably moveable in a first direction and a second direction, and a first symbol position of the plurality of symbol positions being associated with the first input position, and a game controller having a processor and memory storing a plurality of instructions. The method includes transmitting from the encoder a first signal indicative of a first input displacement of the input from the first input position toward the second input position, and animating on the display device the first symbol position displacing in the first direction while synchronously tracking the first input displacement, responsive to receiving the first signal. The method also includes transmitting from the encoder a second signal indicative of a second input displacement of the input subsequent to the first input displacement reaching the second input position, and animating on the display device the reel spinning in the first direction asynchronously with the second input displacement, responsive to receiving the second signal.

In some aspects, the input includes at least one of a button, a thumb stick, a directional pad, a touch pad, a paddle handle, an arm, a dial, a slide, and a lever.

In some aspects, the input includes a variable position lever having one of multi-directional movements, multi-axis movements, multi-directional single-axis movements, and multi-directional multi-axis movements.

In some aspects, the first signal includes at least one of a position, a direction, a velocity, an absolute value, a relative value, and an incremental value of the first input displacement.

In some aspects, the encoder senses at least one of a rotational angle and linear displacement of the input.

In some aspects, the displacing is a first displacing. The method further comprises animating a second displacing of the reel opposite the first displacing when the input moves from an intermediate position between the first input position and the second input position back toward the first input position before reaching the second input position, while synchronously tracking the input moving back to the first input position.

In some embodiments, the instant disclosure provides a non-transitory computer-readable medium storing a plurality of instructions for controlling spinning of a reel in an electronic gaming device. The electronic gaming device has an input being movable between a first input position and a second input position, an encoder coupled to the input and operable to detect a displacement of the input from the first input position, a display device operable to display a reel having a plurality of symbol positions, the reel being controllably moveable in a first direction and a second direction, and a first symbol position of the plurality of symbol positions being associated with the first input position, and a game controller having a processor. When the one or more processor executes the instructions, the one or more processors to perform the steps of detecting at the encoder a first input displacement of the input from the first input position toward the second input position, and animating on the display device the first symbol position displacing in the first direction while synchronously tracking the first input displacement, responsive to the encoder detecting the first input displacement. The one or more processors also perform the steps of detecting at the encoder a second input displacement of the input subsequent to the first input displacement reaching the second input position, and animating on the display device the reel spinning in the first direction asynchronously with the second input displacement, responsive to the encoder detecting the second input displacement.

In some aspects, the input includes at least one of a button, a thumb stick, a directional pad, a touch pad, a paddle handle, an arm, a dial, a slide, and a lever.

In some aspects, the input includes a variable position lever having one of multi-directional movements, multi-axis movements, multi-directional single-axis movements, and multi-directional multi-axis movements.

In some aspects, the first signal includes at least one of a position, a direction, a velocity, an absolute value, a relative value, and an incremental value of the first input displacement.

In some aspects, the encoder is operable to sense at least one of a rotational angle and linear displacement of the input.

In some aspects, the movement is a first movement, and the processor performs the step of animating a second movement of the reel opposite the first movement when the input moves from an intermediate position between the first input position and the second input position back toward the first input position before reaching the second input position. In some aspects, the processor performs the step of animating the second movement while synchronously tracking the input moving back to the first input position.

These and other variations, advantages, aspects and novel features of the present disclosure, as well as details of illustrated implementations thereof, will be more fully understood from the following description and drawings.

DETAILED DESCRIPTION

Implementations of the present disclosure represent a technical improvement in the art of gaming technology. Specifically, the implementations illustrated address the technical problem of current stepper handles of gaming machines having only two detection points, namely: (i) a home or start position, and (ii) a spin position.

Implementations of the present disclosure employ a controller device that variably controls at intermediate controller positions a game element, feature and/or gaming session. The controller device provides precise position, velocity and/or direction synchronization with one or more game elements, e.g., the reels, and/or operations, e.g., the spin, of the EGM. The controller device communicates to the EGM or system platform precise, real-time position feedback in response to a player action or actions. The precise feedback of the controller device enables expanded game play capabilities in unique and intuitive capabilities for the player, while still providing a low cost article of manufacture for EGM manufacturers and casino operators. The added positional feedback allows the player to control or at least the perception of added skilled control of game elements (e.g., where on the reel the spin will start) or operations (e.g., when the reel spin will start after adjusting game elements).

Additionally, a controller device can integrate other intelligent features (e.g., haptic control) to further enhanced capability of interactions in response to player action or actions in using the EGM, whether for game play or non-game play actions. The controller device is adaptable to a wide range of EGM environments from single player EGMs to communal game environments.

The above example is not intended to be limiting, but merely exemplary of technologic improvements provided by some implementations of the present disclosure. Technological improvements of other implementations are readily apparent to those of ordinary skill in the art in light of the present disclosure.

Figure 1:
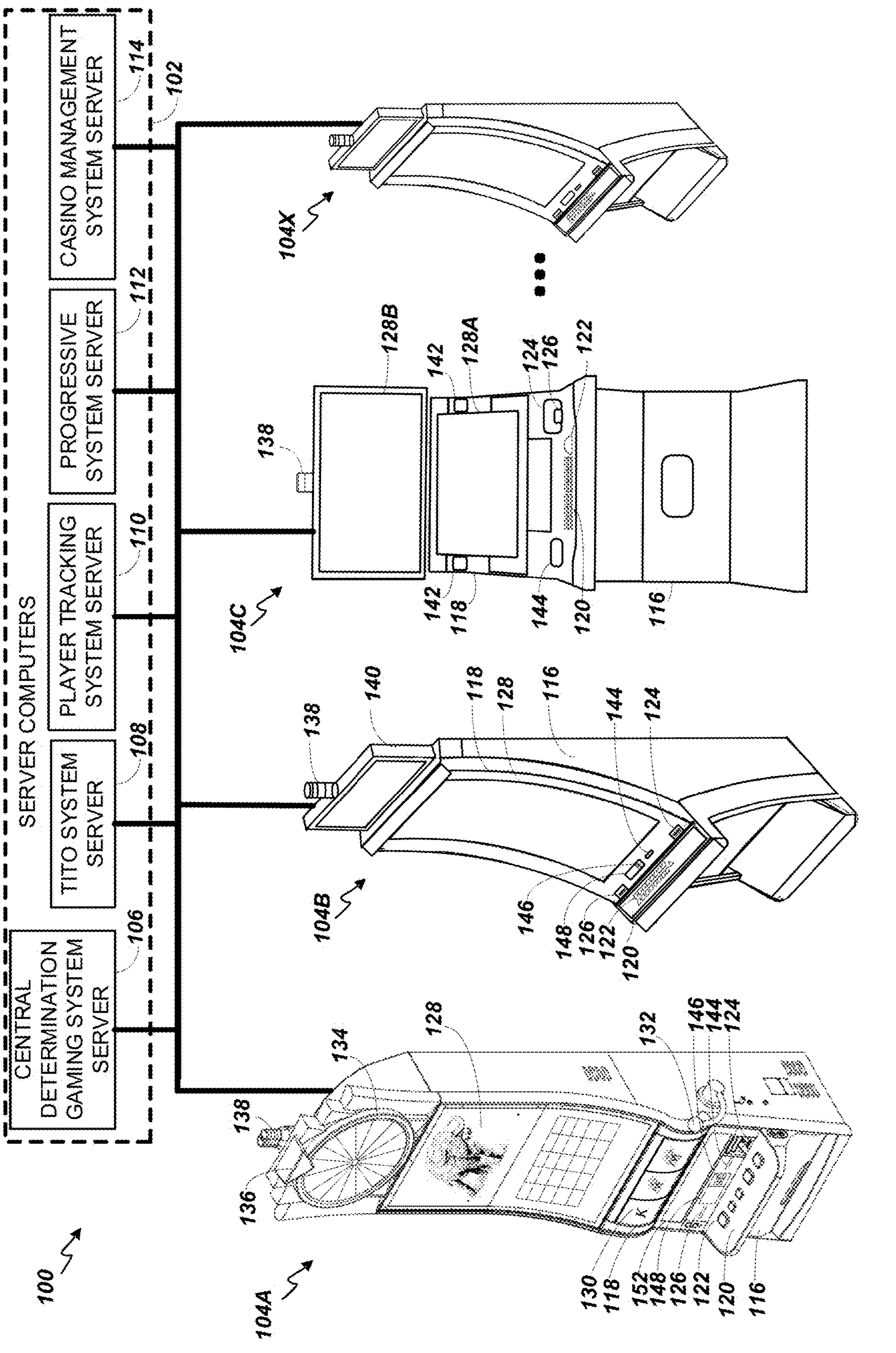
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Other servers (not shown) may be employed to execute other game operations, e.g., a bingo server. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display device 128 (e.g., video display monitor) mounted to, or above, the gaming display area 118. The main display 128 can be a high-resolution liquid crystal display (LCD), plasma, light emitting diode (LED), or organic light emitting diode (OLED) panel (any of which may be flat, curved, combinations of both flat and curved), a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panel(s) 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

In some devices not including a controller device, gaming devices 104A have traditionally also included a lever 132 typically mounted to the side of main cabinet 116. Lever 132 which may be used to initiate game play.

Figure 2A:
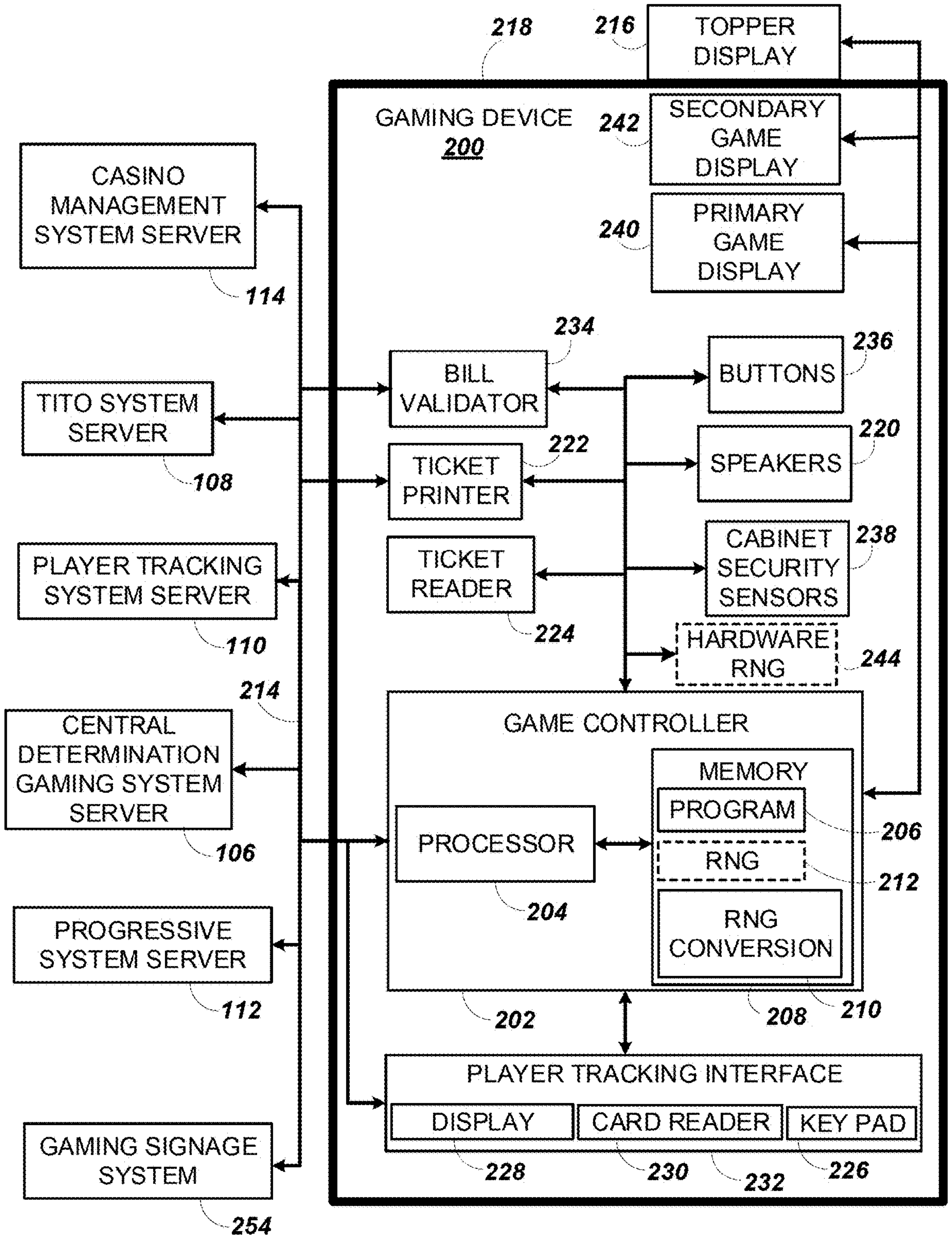
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in at least FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. Other bill validator 124 or other credit input mechanisms may also be employed, for example, a card reader for reading a smart card, debit card or credit card, or arrangements to interact with a digital wallet or the like. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game instructions or programs 206 that provide program instructions and/or data for carrying out various implementations (e.g., game mechanics) described herein. Stated another way, a game instruction or program 206 represents an executable program stored in any portion or component of memory 208. In one or more implementations, a game instruction or program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards and Bingo game ball calls. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game display devices or displays 240 and 242. Alternatively, such display controllers may be integrated into the game controller 202. The use and discussion of FIGS. 1 and 2 are examples to facilitate ease of description and explanation.

Figure 2B:
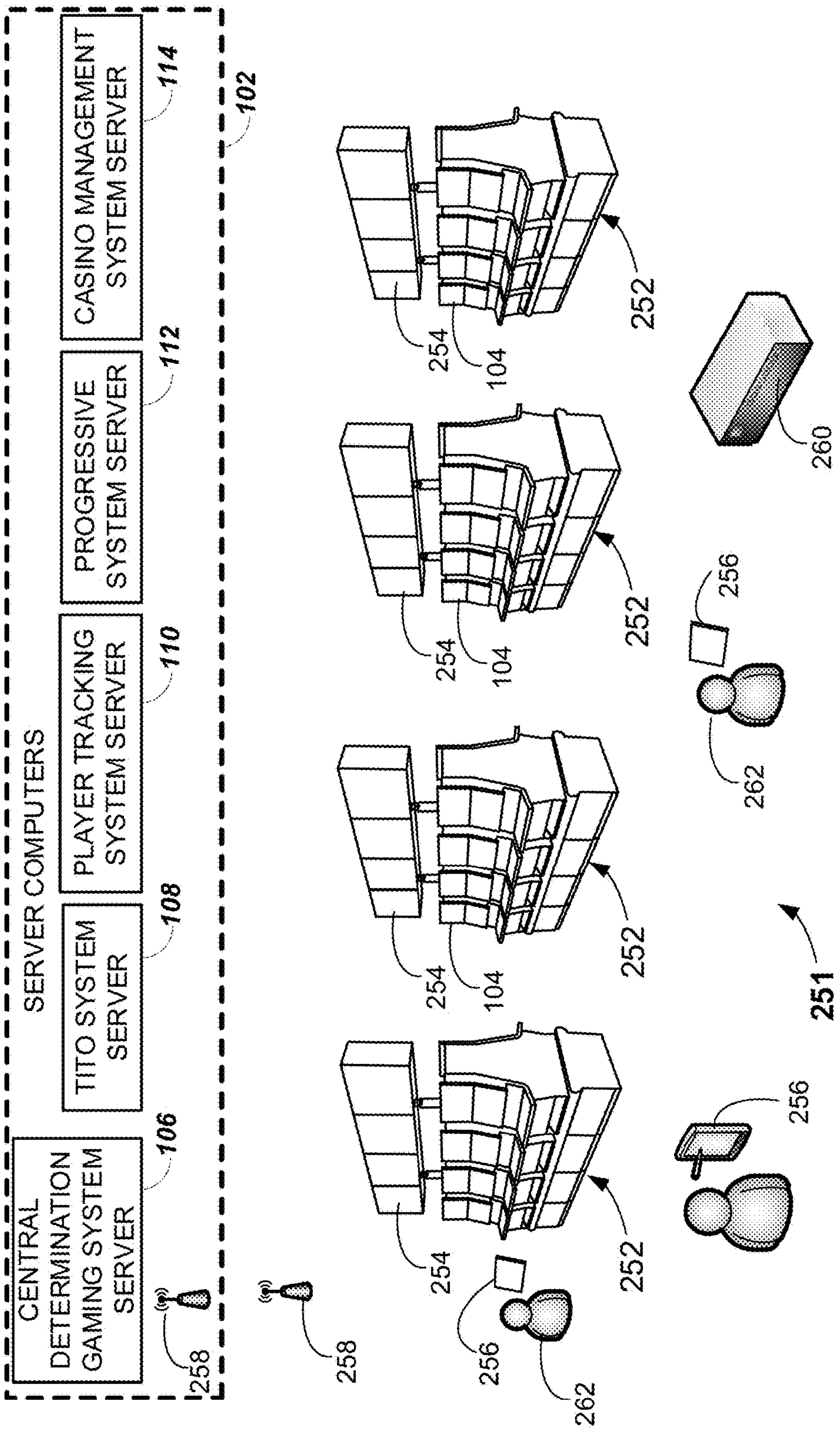
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits. Some mobile gaming devices 154 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button on video touch screen on an EGM (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
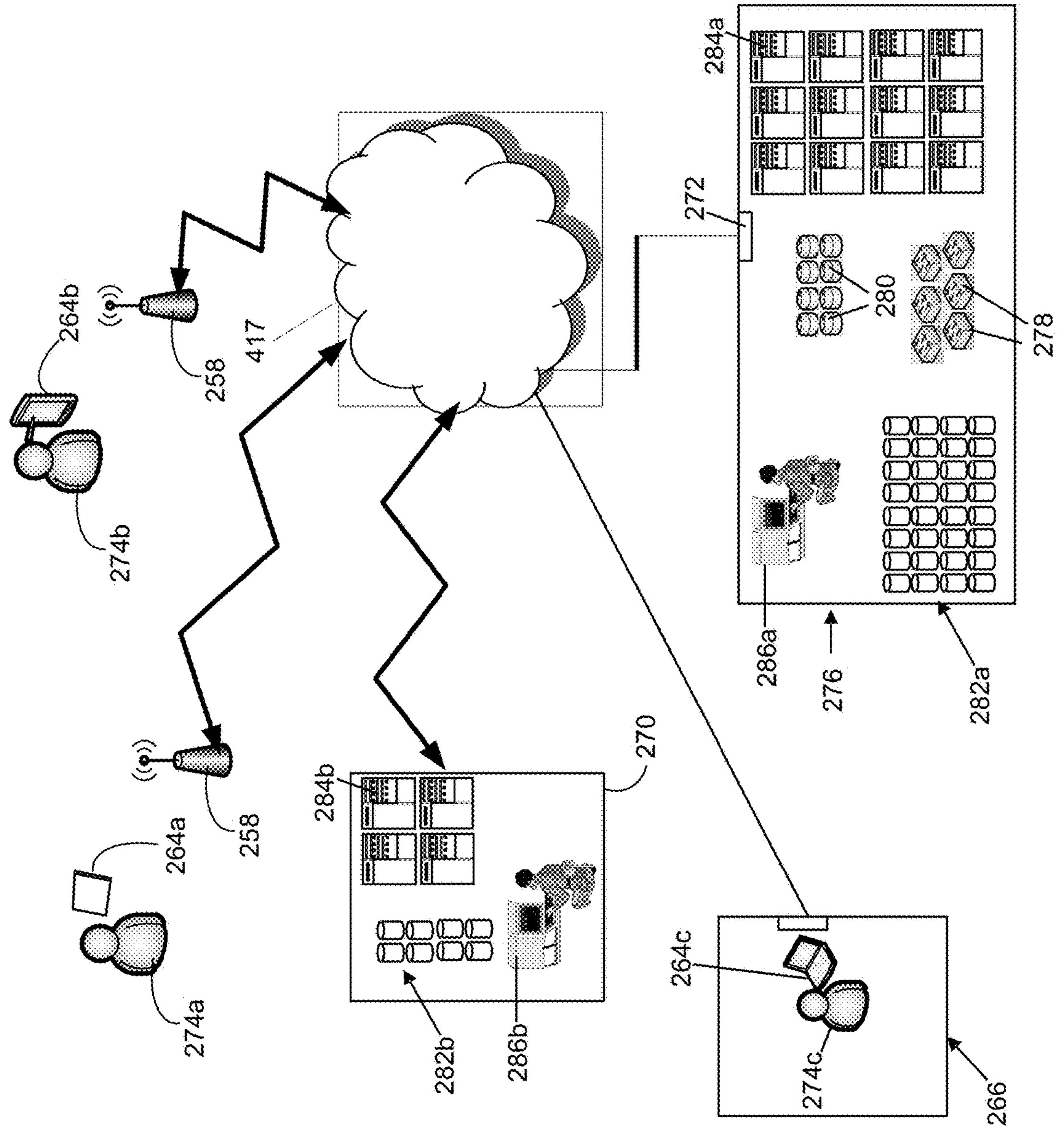
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. Here, the gaming data center 276 includes servers 284*a*, storage devices 282*a*, and one or more workstations 286*a*. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
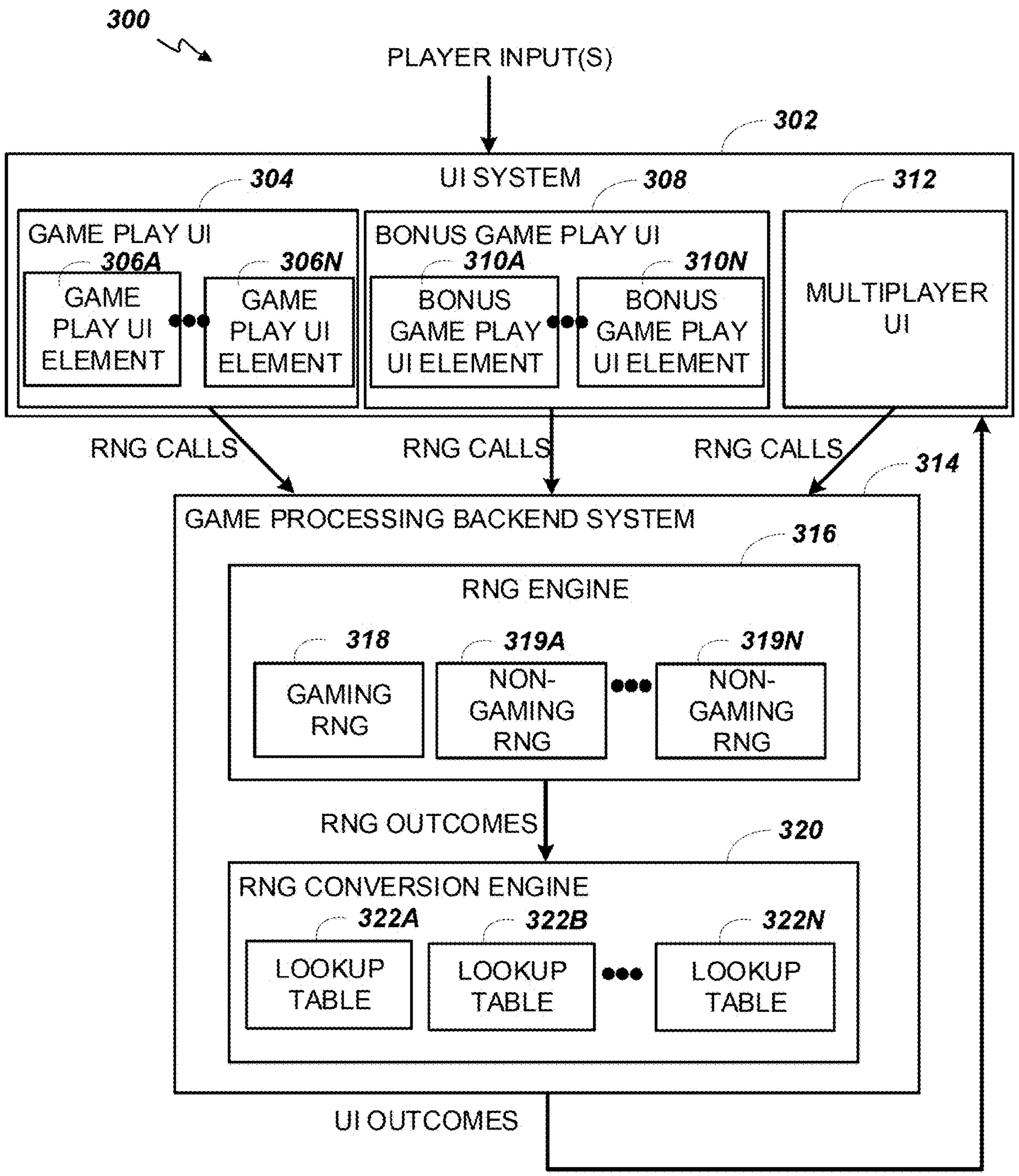
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements

310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

A brief description of electronic gaming reel games follows. Implementations described herein can be implemented in a server computer and/or gaming server 102 and/or gaming device 104A, 104B, 104C, 104X, 200 as described with reference to FIGS. 1 and 2. Thus, a server computer and/or gaming server 102, or gaming device 104A, 104B, 104C, 104X, 200 is an example of an electronic gaming device as described. The game processing backend system and graphical user interface system can be implemented using memory and one or more processors that are part of the electronic gaming device and/or part of a gaming system located remotely from the electronic gaming device. Depending on implementation, the backend system and graphical user interface system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

Electronic gaming devices can incorporate implementations described herein into various types of reel games or other games. A reel game can be a base mode or feature mode (e.g., free game or bonus game mode). A reel game uses spinning reels and one or more reel windows, e.g., reel window 150 on a display screen 128 in FIG. 1.

A base mode includes play that involves a sequence of reel spins, reel stops and win determinations of the stopped reels. That is, a single play of a reel game can constitute a single complete game or wager, e.g., a single spin of the reels or a series of spins and reel stops which culminate in a final aggregate outcome.

A feature mode can, among other things, add the possibility of winning alternative payouts potentially involving different target volatility criterion than the base game. A feature mode typically does not require an additional wager, but certain feature modes may require additional wagers.

As shown in FIG. 1, the reel game may include a display device or display 128 with a reel or game window 150. The reel window 150 is configured to display at least viewable portions of a set of reels associated with the reel or game window 150. For each of the reels, the viewable portion of the reel includes a plurality of positions for one or more instances of symbols from a symbol set. Thus, the reel or game window 150 may display a matrix of one or more symbol positions containing one or more symbol instances on a display device or screen 128, and may be highlighted graphically to emphasize one or more reels, symbol positions and/or symbol instances within the reel window 150. The number of reels and dimensions of the reel window 150 depend at least on display and the game implementation employed.

In some arrangements, the reel window 150 displays y reels with x symbol positions visible to the player. This display of y reels with x symbol positions may be referred to as a reel array. Of course, different reels can have different counts of symbol positions and, in turn, symbol instances possible.

For example, a reel window 150 displays 5 symbol positions for a first reel, a second reel, a third reel, a fourth reel, and a fifth reel. Such a configuration can be described as a 5-5-5-5-5 configuration. For a typical game in base mode, a reel window 150 may display a 5×3 configuration-five reels per window, with three symbol positions showing in the window for each of the reels.

Other game array configurations are possible. For example, more generally, the reel window 150 may accommodate a reel array that spans m reels in a first dimension and spans n visible symbol positions in a second dimension orthogonal to the first dimension, where the value of m can be 4, 5, 6, 7, 8, or some other number of reels, and the value of n can be 2, 3, 4, 5, 6, or some other number of symbol positions.

Typically, the m reels are arranged horizontally in the reel window 150 from left-to-right, with the m reels spinning vertically and the reel window 150 showing symbol positions of each of the visible portions of the respective reels. Alternatively, the m reels are arranged vertically in the reel window 150 from top-to-bottom, with the m reels spinning horizontally and the reel window 150 displaying symbol positions of each of the portions of the visible respective reels. Alternatively, a reel window 150 can have other configurations.

For each of the reels, a reel strip includes z total positions along a one-dimensional strip of symbol positions, where x depends on implementation. For example, z may be 30, 70, 100, 140, or some other number of positions. Different sets of reels can be used for a base mode, feature mode or other gaming mode. For example, for a feature mode, more valuable symbols, such as a WILD symbol or a SCATTER symbol, can be added to the reels to trigger or enhance play of the feature mode. The value of z can be the same or different for different reels (thus, different reels can have different numbers of symbol positions).

In some implementations, the configuration of the symbol instances at the symbol positions of the reel strips for the reels of a reel game is fixed after the reel mode is initiated (e.g., boots), although limited reconfiguration operations may be permitted. In other implementations, the configuration of the symbol instances at the symbol positions of the reel strips for the reels of a reel game can change dynamically after the reel mode is initiated. The dynamic change could depend on bet amount or some other factor(s), for example.

The symbol set for the reels may comprise various types of symbols. For example, symbol set may comprise a plurality of symbols, including a plurality of game symbols, a plurality of trigger symbols and a plurality of special symbols. The symbols can be static or animated. Depending on the application, the symbol set for the reels may comprise one or more special symbol types, at least one JACKPOT symbol type, a WILD symbol type, some number of picture symbol types, some number of game/low symbol types, and a SCATTER symbol type (which may, for example, trigger bonuses).

By way of an illustrative example, the symbol types may be various lower-value symbol types of different denominations (shown as other animals, numbers, card values), a WILD symbol (shown as a stylized WILD), a SCATTER symbol, a symbols for free games (e.g., Forever Free Games) and include a high-value symbol (shown as a buffalo symbol). The SCATTER symbol is a dynamic symbol that is resolved to one of several different SCATTER symbol types (which may be a regular coin, a super coin, or one of several different jackpot coins) upon a spin. Alternatively, other and/or additional symbol types can be used. Various jackpot symbols and combinations thereof may be used to trigger wheel award progressive and other progressive multipliers, for example.

A symbol set for the reels can also include other and/or additional symbols. In general, for a given type of symbol, one or more instances of the symbol can appear in a reel strip, but games can have different constraints on symbol placement. The symbol set can be the same or different between a game in the base mode and a game in the feature mode. Some types of symbols are dimmed out (not active at times).

Depending on context, the term "symbol" can indicate a symbol type or a symbol instance. In general, a WILD symbol instance can substitute for any other symbol (except, in most implementations, a SCATTER symbol or jackpot symbol) when determining win conditions along pay lines. In general, a SCATTER symbol instance can contribute to a win condition even if it is not on the same pay line as another scatter symbol. In some implementations, a win condition depends on a game instance count of a SCATTER symbol that occurs anywhere within a reel array, regardless of where they land within the reel array.

As in a reel game with physical reels, the reels of a reel game on a display 128 "spin" graphically through a reel window 150 on the display device or screen 128 to render partially visible the reel strips, when a player actuates a "spin" or "play" button, which acts as a "pull" or "spin" event. The backend system randomly selects symbol positions of reel strips at which to stop the reel strips for the respective reels, and the respective reels stop at the selected symbol positions of the reel strips, with some number of symbol positions visible in the game window for each of the reels. For example, for a given reel, the backend system to the game machine generates a random number and determines a symbol position or symbol instance at which to stop the reel strip of the reel using the random number (e.g., with a lookup table). The backend system to the game machine may generate a different random numbers for the respective reels that are spun. In this way, the backend system to the game machine can determine which symbol positions (and, in turn, symbol instances) of the respective reels are visible in the reel window 150 on the display device or screen 128.

In other scenarios, symbol instances visible in a reel window 150 can be "transferred" or moved (e.g., drag and dropped by the player's touch) from another reel window 150 when certain conditions are satisfied. For example, symbol instances can be graphically transferred or otherwise added to the reel window 150 for a feature mode game from a base mode game upon the occurrence of certain conditions for the base mode game.

Generally, the backend system may determine various outcomes and perform operations for various types of games in the base mode and feature mode. For example, for various types of events, the backend system, e.g., as in FIG. 3, uses an RNG (which can be a cryptographic RNG or PRNG) to generate a random number and that maps the random number to an outcome using a lookup table. This series of operations is generally referred to as an RNG operation. A graphical user interface of the gaming device can then output a display or other indications of those outcomes and perform operations.

FIG. 3 shows examples of lookup tables 322A-322N. These lookup tables 322A-322N may comprise weighted tables.

Generally, a lookup table can be implemented to assign probabilities to different possibilities, in order for one of the different possibilities to be selected using a random number. Different possibilities are represented in different entries of a lookup table. The probabilities for different possibilities can be reflected in threshold values. By way of example, for a random number RND, generated by an RNG, in the range 0<RND<=100, with four possibilities, 0<RND<=30 for entry 1, 30<RND<=65 for entry 2, 65<RND<=92 for entry 3, and 92<RND<=100 for entry 4). The threshold values can represent percentages or, more generally, sub-ranges within the range for a random number.

In some implementations, the threshold values for a lookup table are represented as weights (sometimes referred to as count values) for the respective entries of the lookup table. For example, the following table shows weights for the four possibilities described above:

TABLE 1

Exemplary Lookup Table

| Weight | Entry |
|---|---|
| 30 | <value 1A; value 2A . . .> |
| 35 | <value 1B; value 2B . . .> |
| 27 | <value 1C; value 2C . . .> |
| 8 | <value 1D; value 2D . . .> |

The backend system can use a random number, generated between 1 and the sum total of the weights, to select one of the entries in the lookup table by comparing the random number to successive running totals. In the example shown in Table 1, if the random number is 30 or less, the first entry is selected. If the random number is between 30 and 65, the second entry is selected, and, if the random number is between 65 and 92, the third entry is selected. Otherwise, the last entry is selected.

The lookup table threshold values for a lookup table can vary dynamically (e.g., depending on bet amount). The lookup table threshold values can also be fixed and predetermined. Or, a lookup table can be dynamically selected (e.g., depending on bet amount, depending on another factor) from among multiple available lookup tables. Different choices or parameters during game play can use different lookup tables. Or, different combinations of choices or parameters can be combined in entries of a given lookup table.

In general, after reels have stopped (landed) in a reel window 150, any win conditions can be determined and selected win amounts can be awarded to the player (e.g., credited to the player's credit balance). In some examples, win conditions depend on a count of particular symbol instances in a reel window 150.

In other examples, win conditions are defined as combinations of symbol instances along pay lines (also called win lines) across at least a visible portion of a reel array on a display screen 128. A pay line is commonly traversed from one side of the reel window 150 to the opposite side of the reel window 150 (e.g., left to right), using one symbol instance per reel along the pay line as part of possible combinations of symbol instances. When a certain combination of symbol instances appears along a pay line, a win amount corresponding to that combination of symbol instances and that pay line is awarded for that round of play.

Win amounts can vary according to the combination of symbol instances and according to the particular pay line along which the combination of symbol instances appears. Win amounts are typically determined according to a pay table, where the pay table assigns the various combinations of symbol instances and pay lines that may occur (win condition possibilities). The win amount for a round of play may be a fraction of an amount wagered for that round of play for certain win conditions. For other win conditions, the win amount may be much larger than the amount wagered.

The number of pay lines and base credit costs to play depends on implementation. There can be 2×, 3×, 4×, and 5× bet multipliers. Multipliers can also appear as symbols in reels. Alternatively, there could be higher bet multipliers, different credit options, and/or a different number of pay lines.

Depending on the implementation, symbol instances along a pay line can be counted in different ways. For example, when evaluating a win condition along a pay line, only symbol instances along the pay line in adjacent reels are counted. On the other hand, when evaluating a win condition along a pay line, symbol instances along the pay line in any reel can be counted, even if the reels are not adjacent. For a given pay line, only the highest-paying combination of symbol instances is awarded. Alternatively, for a given pay line, all possible combinations of symbol instances are awarded, in the aggregate. A given symbol instance (e.g., wild symbol) is counted only towards its highest-paying combination in a given pay line. Alternatively, a given symbol instance can be counted towards multiple combinations in a given pay line.

An award can alternatively be determined according to a "ways" approach. This approach is sometimes referred to as a "ways evaluation." For a ways evaluation, each possible path through designated (active) symbol display position(s) of the respective reels provides a way to win. A path is traversed from one side of the reel array to the opposite side of the reel array (e.g., typically left to right), using one symbol instance per reel along the path. For one symbol instance per reel in a combination, any symbol instance displayed at an active symbol display position for a given reel in the reel array can be used to form a symbol instance combination with any symbol instance displayed at an active display position of each of the other reels. The designated (active) symbol display positions for the respective reels can be pre-defined and static. For example, the designated (active) symbol display positions for each reel can be all of the symbol display positions enclosed in a reel window 150 for the reel. Or, the designated (active) symbol display positions for the respective reels can change, e.g., depending on a bet amount.

As a result, the total number of ways to win is determined by multiplying the number of active display position(s) of each reel. For example, for five reels each showing four symbol instances at active display positions in a reel window 150, there are $4^5=1024$ ways to win for all-ways evaluation. As another example, for five reels, with the first and second reels each showing three symbol instances and the remaining reels each showing four symbol instances at active display positions in the reel window 150, there are 3×3×4×4×4=576 ways to win for all-ways evaluation.

A player can choose a bet denomination (e.g., one cent, two cents, five cents) or use a default bet denomination for a base reel game. The player can also choose a bet amount (e.g., different amounts of credits) or use a default bet amount. The bet amount may affect the number of reels that are selected for all-ways evaluation-from one reel up to five reels, depending on the bet amount. The player can also choose a bet multiplier (e.g., 1×, 2×, 3×, 4×, 5×) or use a default bet multiplier (e.g., 1×). Alternatively, other bet settings, evaluation approaches, etc. can be used.

The player initiates a spin for the base reel game (e.g., pushing a spin button). The spin uses the bet denomination, bet amount, and bet multiplier in effect (either default or selected by the player), assuming credits are sufficient in a credit meter. The credit meter decreases by the bet size.

For the spin of the reels in the base mode, a check is made whether a feature mode is triggered. In particular, a random number is generated, and the random number is mapped to an outcome (i.e., that the feature mode is triggered, or that the feature mode is not triggered) using a lookup table. The lookup table that is used can depend on the bet amount. Generally, as the bet amount increases, the feature mode is more likely to be triggered, as reflected in weights for the possible outcomes in different lookup tables for different bet amounts. Alternatively, the feature mode can be triggered in some other way.

As discussed, a feature mode may be awarded or triggered in an electronic gaming device. The feature mode may enhance the electronic gaming device and the experience of players by adding elements of excitement and chance, e.g., a Cash-on-Reel (COR) feature. The feature mode can utilize a controls, different sets of reels, display screens, symbols, etc. than the base mode does in its normal operation.

Alternatively, the feature mode can reuse or reconfigure at least some of the reels, display screens, symbols, etc. of a base reel game. The feature mode can be started in response to satisfaction of a trigger condition. For example, the feature mode can be initiated upon the occurrence of some defined combination of symbol instances, or a threshold count of certain symbol instances in one or more sets of reels. Alternatively, the feature mode can be triggered in some other way (e.g., randomly).

In some implementations, if at least a threshold count (e.g., three or more) of instances of a scatter symbol (coin, super coin, or jackpot) land in any position, a free games feature may be triggered. In a free game mode, the player is prompted to start the free games feature, and a transition to the free games feature occurs. Each spin of the free games feature is started in response to a user input event. The free games feature continues until all free games (spins) have been used. The number of free games depends on the count of instances of a scatter symbol that have landed to trigger the free games feature. The number of free games can be increased if the free games feature is "re-triggered" from within the free games feature.

The outcome of the spin is then determined using all-ways evaluation, generally as described above for the base reel game. Alternatively, outcome evaluation can be performed using a different approach for a spin of the free games feature. In any case, after the outcome evaluation for a spin, any credits from winning combinations of symbol instances are shown in a win meter. The free games feature continues in a cycle of spin/stop/outcome evaluation until there are no more free games (spins). After the outcome evaluation for all spins of the free games feature, the total from the win meter is added to a credit meter and the free game feature reverts to the base or other game mode.

Figure 4:
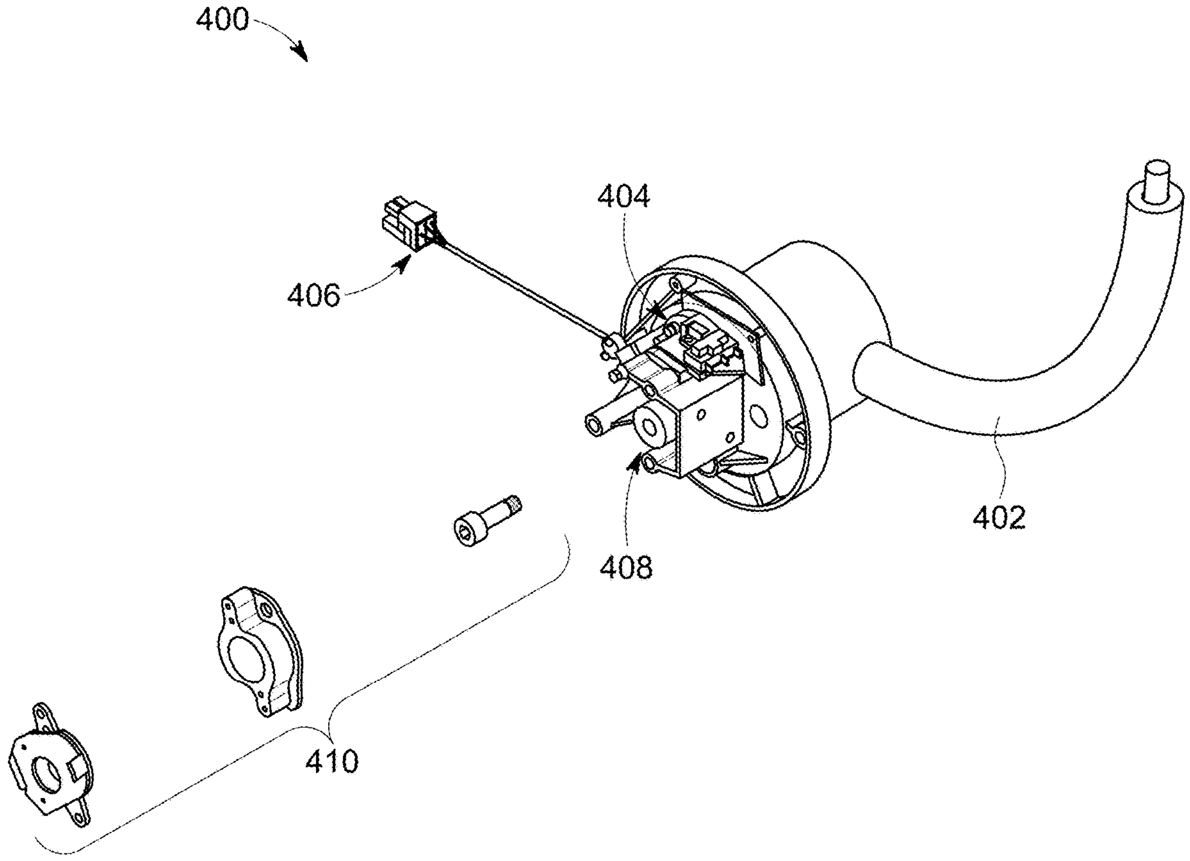
FIG. 4 illustrates a partial exploded view of a controller device in accordance with various implementations described herein.

Referring now to FIG. 4, gaming machines, devices and/or systems comprise a controller device 400 that allows the player or players to variably control one or more game elements, features and/or gaming operations. The controller device 400 may have one or more inputs 402. The input 402 may comprise a pull lever, as in the one illustration shown in FIG. 4. In other illustrations, the input 402 may comprise a button(s), a thumb stick(s), a directional pad(s), a touch pad(s), or a paddle(s), for example. Two or more inputs 402 may be included on a controller device 400 and provide similar or different functions when employed together.

As shown in FIG. 4, the input 402 may be in the form of a handle, arm, or lever that moves along a single axes. Or, the input 402 may also be in the form of a variable position lever that has more than two degrees of movement, e.g., multi-axis movements, that permits movement in different directions on the same axis (multi-directional single-axis movements), or different directions on different axes (multi-directional multi-axis) to provide varied, multi-axis control input capability. The input 402 may be configured to include haptic and/or audible feedback to the player, such as ratchet sounds, etc.

The input 402 may be connected to a controller housing or hub 404. The controller housing 404 may be electrically connected by an output component (e.g., serial connectors) 406 or the like to output data to one or more game controllers 202 housed in the EGMs 104A-X or other device to communicate, e.g., the position, direction and/or velocity information of the controller device 400.

The controller housing 404 includes various physical connections, e.g., a shaft receiver 408, that interconnect to electronic and mechanical systems or components of the EGMs 104A-X. The controller housing 404 may house, or connect to, components (not shown), such as one or more decoders, USB translators, power sources, sensors, actuators, output devices and other mechanical or electrical systems or components that are not shown depending on the configuration implemented.

FIG. 4 also shows an exploded view of an encoder or encoder unit 410. The encoder 410 may sense and encode rotational angle and/or linear displacement of the input 402, for example. Encoder 410, in the case of a rotational angle input, converts the angular position or motion of a shaft or axle to analog or digital output signals. For example, the encoder 410 may detect the rotational position of a lever input 402 shown in FIG. 4. Other inputs 402 may employ an encoder 410 or similar device that may detect linear motion along a path, i.e., linear displacement.

The encoder 410 may include a sensor that may provide an output signal to an EGM 104. The sensor employed may be mechanical, magnetic (e.g., on-axis or off-axis), optical or laser, for example, depending on the gaming environment used. The output signal may be communicated or transmitted to the game controller 202 or other device via an output component 406 in communication with one or more components of the controller housing 404. The output signal may be absolute, relative, or incremental. Employing an encoder 410 having an absolute output signal may provide information to the game controller 202 to communicate or transmit the position of the controller device 400, e.g., the position of a shaft rotated between the controller device 400 and the EGMs 104A-X. Such an encoder 410 may also be referred to as an angle transducer. Depending on the gaming environment, an absolute encoder may have a benefit of maintaining position information even with a power outage at the gaming establishment (e.g., a casino or bar). Similarly, employing an encoder 410 that has a relative output signal may provide information to the game controller 202 to communicate the position of the controller device 400, e.g., the position of a shaft rotated between the controller device 400 and the EGMs 104A-X with respect to a specific position.

Employing an encoder 410 having an incremental output signal may provide precise information to the game controller 202 concerning position, velocity and direction of the input 402, which may provide real-time information and higher degree of measurement resolution for the movement of input 402. However, if the absolute position is to be tracked with an incremental encoder, a bidirectional electronic counter or similar to device may be needed. Regardless of the encoder type deployed, encoder 410 provides enhanced monitoring and/or control of game features, elements and/or operations by the player or players throughout the movement or positions of the input 402.

Additionally, the controller device 400 may have multiple states being monitored along a movement path. For example, some of those states may include position, velocity and direction of the input 402. The states may, for example, include a home position, various movements, actuated trigger positions, and/or a game initiation or spin positions. One or more of these states may change as the input 402 moves from one position to another position, at one velocity to another velocity along a movement direction, or from one direction to another direction. The controller device 400 may be dynamically reconfigured to change from and to one or more states and/or one or more triggers. Alternatively, the coupling of the controller device 400 to the gaming machine(s) 104A-X may be done wirelessly where the controller device 400 is separate from the gaming machine(s) 104A-X and communicates to a receiver that may be located in the gaming machine(s) 104A-X or elsewhere in a gaming network.

The coupling of the controller device 400 to the gaming machine 104A-X may include electrical and mechanical structure and mechanisms to allow at least the input 402 to be moved by the player to a predetermined position, velocity or direction to trigger or initiate a change to a game element, feature and/or gaming session. The controller device 400 may be coupled to a main cabinet or gaming cabinet 116. The controller device 400 may be positioned in a number of locations depending on the features employed. A location of input may be to player's right side when facing the gaming device(s) 104A-X as is with familiar with some gaming machine handles. The input 402 may be located at the left side of the gaming devices 104A-X. Depending on the game configuration, the input 402 may be positioned in a button deck 120 area, for example.

In traditional arrangements, a slot machine does not detect slight movements or intermediate pull positions of the slot machine handle; rather, it only detects when the slot machine handle reaches a trigger position to initiate the game session (i.e., to spin the reels). That is, the traditional arrangement for a slot machine handle is to provide a home position and a second position to initiate the game so as to prevent accidental game initiations at intermediate positions, e.g., when a partial pull of the slot machine handle is made.

The electrical and mechanical system, structure and mechanism for coupling the controller device 400 to the gaming machine(s) 104A-X may, when in the form of a lever, permit the forced return by the player or other mechanical means of input 402 to its home or initial position after a player initiated the gaming session. In some instances, the input 402 may be released at a game initiation trigger point by the player of the input 402 and allowed to make a controlled return to a start or home position.

The controller device 400 may be retrofitted to certain existing gaming machine(s) 104A-X. In some implementations, the controller device 400 may be retrofitted through a complete installation of the controller device 400 that includes hardwiring it to the circuitry inside the gaming cabinet, along with inclusion of certain firmware and software.

The controller device 400 may also provide tactile or haptic feedback to the player. Such feedback may include, for example, physical sensations during gaming machine operations. For example, the input 402 may vibrate in response to game operations or a game element being positioned or reaching certain intermediate positions. The tactile or haptic feedback is contemplated to be natural and realistic in relation to that which may be experienced by the game play feature or element or in performing in a game machine activity. In certain implementations, additional motors or other actuators in the controller device 400 may be required to communicate or convey physical sensations to the player in conjunction with other visual and auditory game play feedback that may be implemented.

The controller device 400 may additionally control lighting features associated with the gaming machine(s) 104A-X. For example, the movement in one direction of input 402 may be synchronized with integrated lighting to indicate how far the input 402 has moved in one or more movement directions, to indicate the position that the input 402 has moved to, or to reflect the different speed at which the input 402 is moved. The input 402 may be also configured with integrated lighting of the gaming machine(s) 104A-X to indicate when a game trigger has been reached or a milestone in the game has been reached as a result of the position of the input 402. Some of these lighting control features are illustrated in FIGS. 7A-7E and 8A-8E, which will be discussed further below.

Referring back to FIG. 4, the input 402 may be configured to control one or more aspects of the gaming device machine operations in response to a player's actuation of and/or interaction with the input 402. For example, an implementation of the controller device 400 uses a lever as the input 402. The input 402 illustrated allows a player or players to control aspects of the wagering game in response to the player or player's movement of the lever 402 in a first direction (e.g., forward or in some other direction relative to the gaming machine(s) 104A-X) and/or in a second direction (e.g., backward or in some other direction relative to the gaming machine(s) 104A-X) after leaving an initial input position or other position but before a spin signal is triggered when the input 402 reaches a spin input position. As the player moves the controller device 400 between an initial input position or home position and a trigger or spin position, the game element (e.g., a reel or reels) moves to follow or track the controller device 400 movements (i.e., forward, backward or in some other direction relative to the gaming machine 104A-X). When the player has decided to actuate a game element(s) (e.g., the reels) for game play or upon a predetermined condition in the game, the player or game controller may take a further designated action to actuate the game element(s), e.g., stop the reels or spin the reels. Such designated action may include, if by the player, the player pulling of a lever all the way to a spin or actuation position or the player pressing a micro-switch or button on the end of a lever ball, rotating a deal, or moving a slider that will start the spin actuating the game. Of course, the input 402 can be configured to allow its movement to, in turn, direct the movement of a reel, movement of symbols, selection of features, reel sizing, game element sizing, and/or sequencing or synchronization of various game elements, by way of example.

Figure 5:
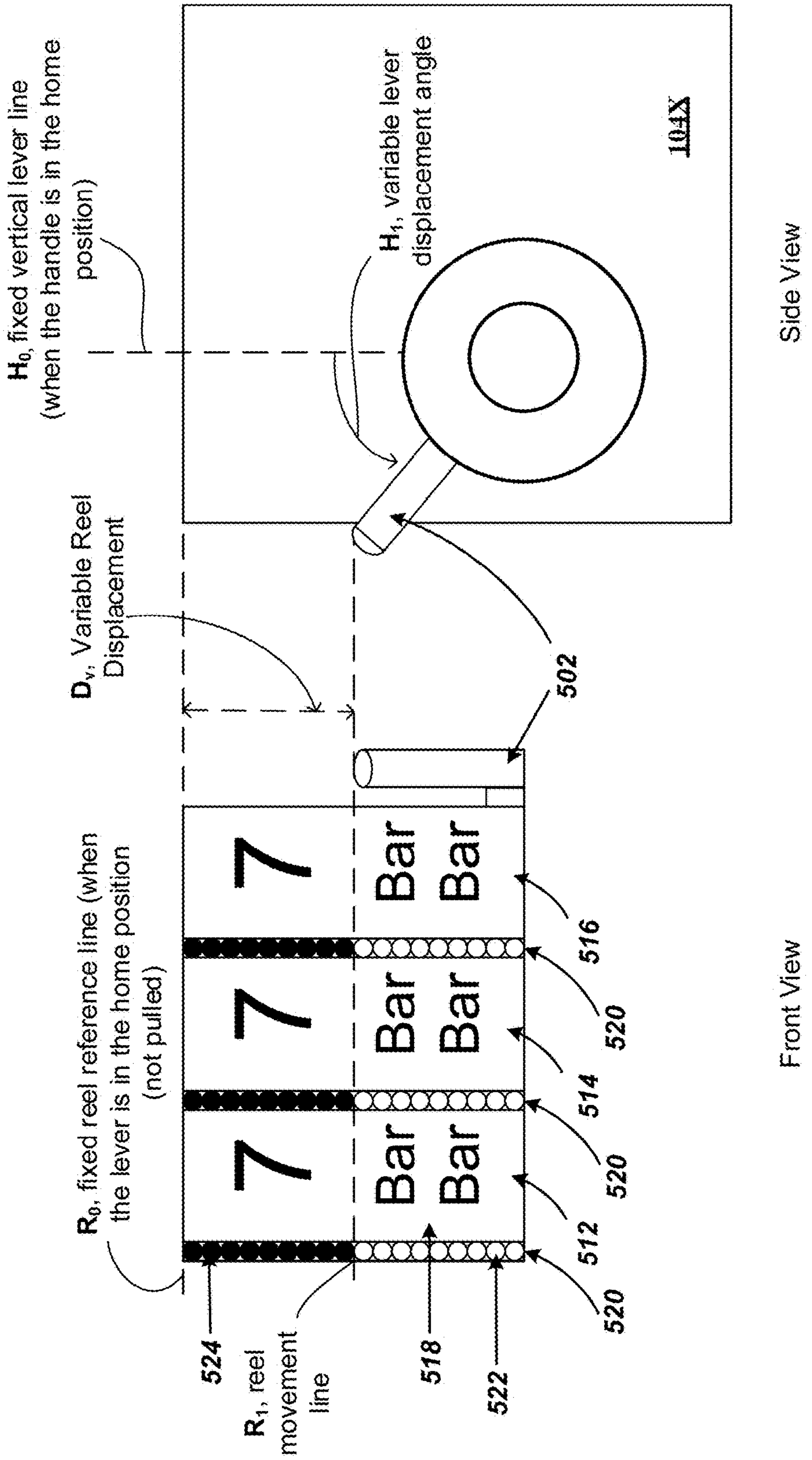
FIG. 5 illustrates a portion of a front view of a gaming machine with a set of reels and a portion of a side view of the game machine with a controller device depicting exemplary relative positions of the set of reels and a controller device in accordance with various implementations described herein.

FIG. 5 illustrates a portion of a front view and of a side view of a gaming machine 104A-X. The front view shows a portion of a set of reels 512, 514, and 516. As shown in FIG. 5, the reels 512, 514 and 516 comprise a reel strip with a plurality of symbol positions 518 occupied by symbols. FIG. 5 displays, in the front view, for illustration purposes, two symbol positions 518 per reel. It is understood that a variety of symbol positions may be displayed per reel depending on the game configuration or game requirements.

In some implementations, as shown in the side view of FIG. 5, the motion of the input 502 moves to a first intermediate position, or a first input position, through a variable lever displacement angle ($H_1$) from a fixed vertical lever line ($H_0$), or a home input position. The motion of the input 502 may be detected or sensed by the encoder unit (e.g., 410 in FIG. 4) and communicated to the game controller (e.g., 202 in FIG. 2A) via an input signal indicative of the motion. The game controller 202 may control the motion of one or more of the reels 512, 514 and 516, based on the input signal received from the encoder unit, so that the one or more of the reels 512, 514 or 516 may move synchronously or in a synchronous fashion with the motion of the input 502.

In this example, as shown in both the front view and side view in FIG. 5, the motion of all of the reels 512, 514 and 516 synchronously tracks or follows with the motion of the input 502 and occurs simultaneously but variably until a trigger is reached or activated to deactivate the synchronous movement. The motion of the reels 512, 514 or 516 is shown in the front view of FIG. 5 as a variable reel displacement ($D_v$), which reflects the variable reel motion, which can be linear or angular, from an initial reel reference point or line ($R_0$) to a reel movement point or line ($R_1$). As such, symbol position (a "7" symbol) associated the initial reel reference point or line ($R_0$) moves in a first direction, e.g. a forward direction or a downward direction to synchronously track the motion, or the variable lever displacement angle. In some cases, the symbol position (the "7" symbol) synchronously moves downward in a speed that substantially tracks a speed exhibited by the motion.

Additionally, in some embodiments, positioned along the sides of each of the reels 512, 514 and 516 are light sources 520 with one or more of the light sources 520 in an "off" state 522 (illustrated with the filled in light source) and in an "on" state 524. The light sources 520 that are in the on state 524 may correspond to the amount of variable reel displacement ($D_v$) of the reels 512, 514 and 516 in response to a corresponding motion of the input 502 in some examples. The light sources 520 may also be activated in response to the speed of movement or direction of the input 502 in other circumstances.

FIGS. 6, 7A through 7E, 8A through 8F, show a first implementation and a second implementation in accordance with various implementations described herein. While FIGS. 6, 7A through 7E, 8A through 8F depict mechanical reels 612, 614 and 616, it is understood the reels 612, 614 and 616 could be video or other virtual reels. Within each implementation in accordance with various implementations described herein, it is understood various other movement, position or speed sequences are possible beyond those illustrated.

Figure 6:
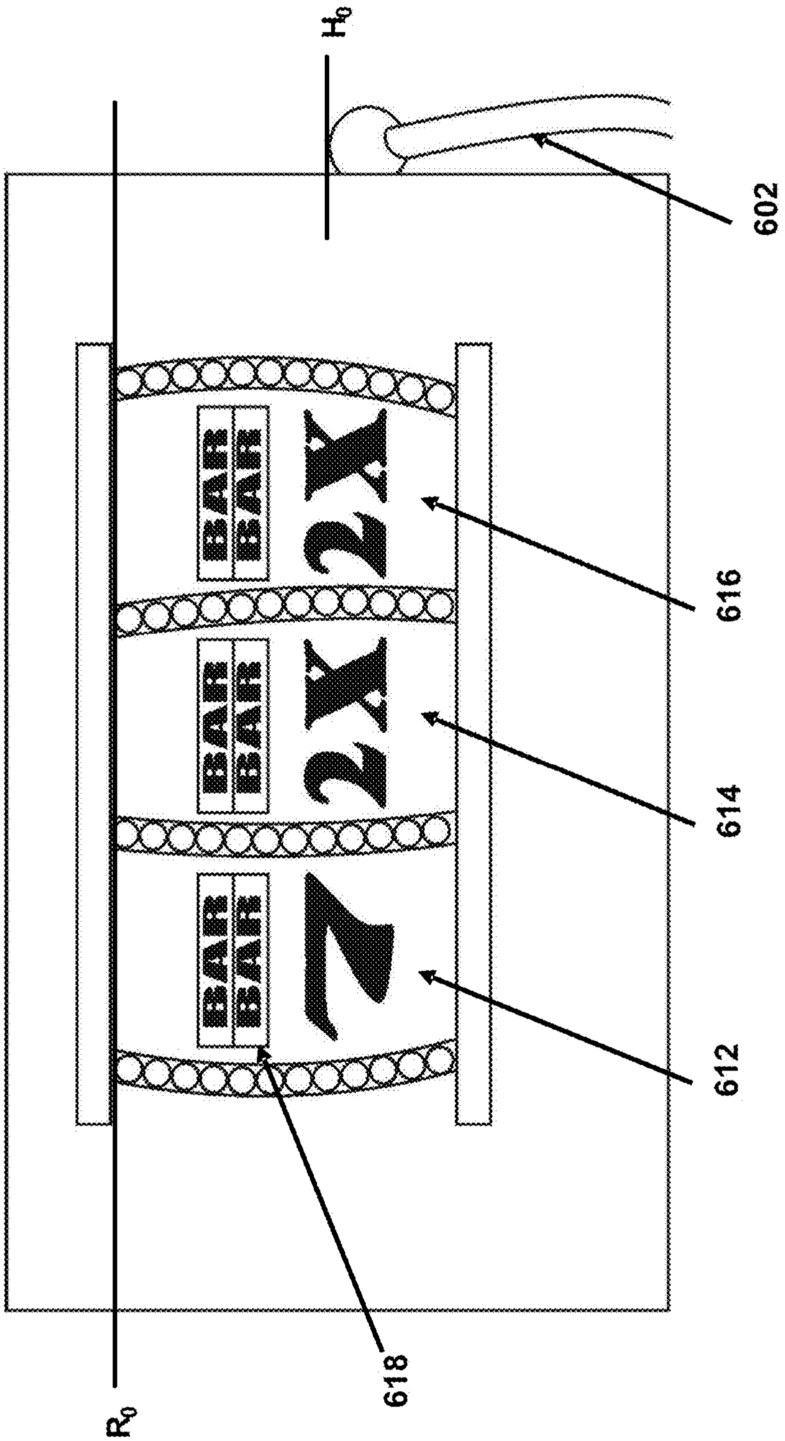
FIG. 6 illustrates an implementation including a portion of a gaming machine with a set of reels and a controller device both in a home position or start position in accordance with various implementations described herein.

FIG. 6 illustrates a portion of a gaming machine 104A-X with a set of reels 612, 614 and 616 and a portion of a controller device 602. Each set of reels 612, 614 and 616 comprise symbol positions 618. The home or initial position for one or more reels 612, 614, or 616 is indicated by reel reference line ($R_0$). The controller device 602 is also in a home or initial position ($H_0$). The controller device 602 and/or one or more reels 612, 614, or 616 may be designated to be at other home or initial positions depending on the game configuration.

Figure 7A:
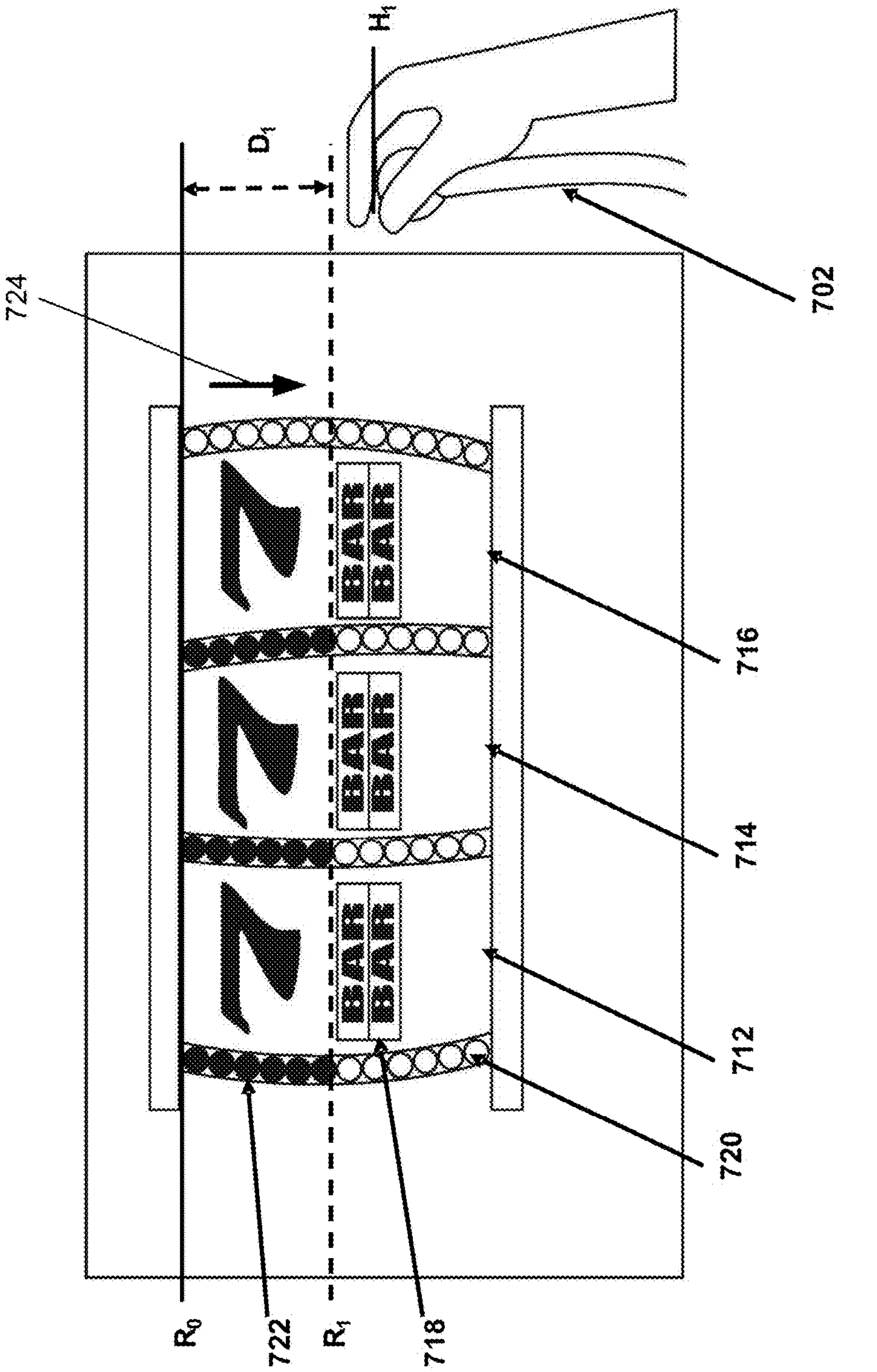
FIG. 7A illustrates a first implementation including a portion of a gaming machine with a set of reels and a controller device both moved to a first intermediate position from a home position or start position in accordance with various implementations described herein.

FIGS. 7A-7E represent the first implementation. Specifically, FIG. 7A illustrates a gaming machine 104A-X comprising a set of reels 712, 714 and 716, and a controller device 702. The controller device 702 has moved to a first intermediate position $H_1$ from a home or start position $H_0$ at a first speed and in a first direction 724 detected by an encoder unit (e.g., 410 in FIG. 4). The set of reels 712, 714, and 716 synchronously move at the first speed or substantially close to the first speed in the first direction, in response to the controller device 702 movement, through a variable reel displacement $D_1$ to a first reel movement line $R_1$ from a reel reference line $R_0$. In some embodiments, light sources 722 track the movement of the set of reels 712, 714, or 716, and the controller device 702. In some embodiments, reels 712, 714, and 716 begin to synchronously move, synchronously move or spin at the same speed or substantially the same speed, or synchronously move or spin in the same direction, synchronously move to stop simultaneously or concurrently.

Figure 7B:
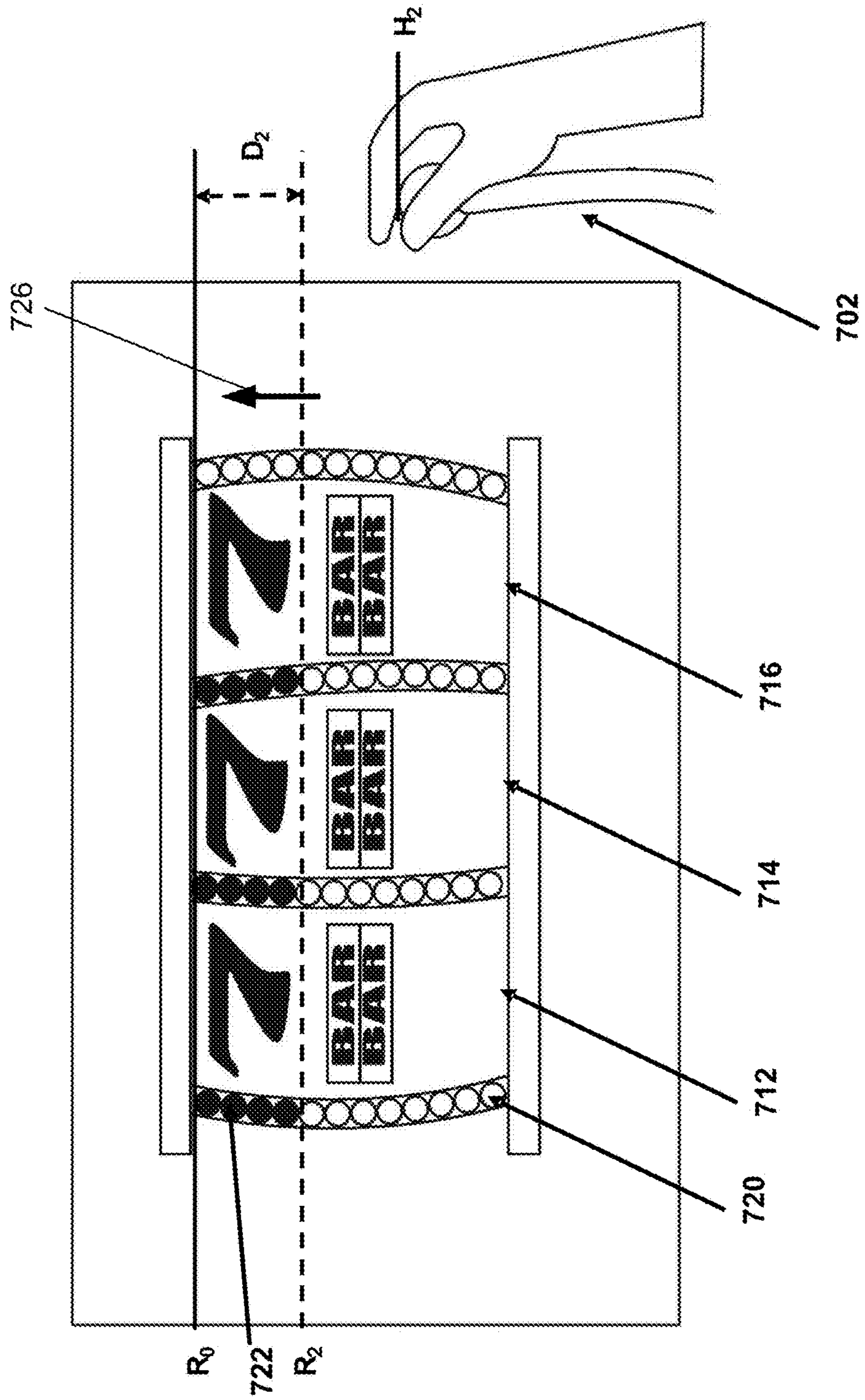
FIG. 7B illustrates a first implementation including a portion of a gaming machine with a set of reels and a controller device both moved to a second intermediate position from a first intermediate position of FIG. 7A in accordance with various implementations described herein.

FIG. 7B illustrates a portion of a gaming machine 104A-X comprising a set of reels 712, 714 and 716, and a controller device 702. The controller device 702 has moved to a second intermediate position $H_2$ from a first intermediate position $H_1$ (shown in FIG. 7A). The set of reels 712, 714, and 716 synchronously move in a second direction 726 opposite the first direction, in response to the controller device 702 movement, through a variable reel displacement $D_2$ to a second reel movement line $R_2$ from the first reel movement line $R_1$ (shown in FIG. 7A). In such a case, the variable reel displacement $D_2$ is less than the variable reel displacement $D_1$. In some embodiments, the light sources 722 of lighting 720 track the movement of the set of reels 712, 714 or 716 and the controller device 702.

Figure 7C:
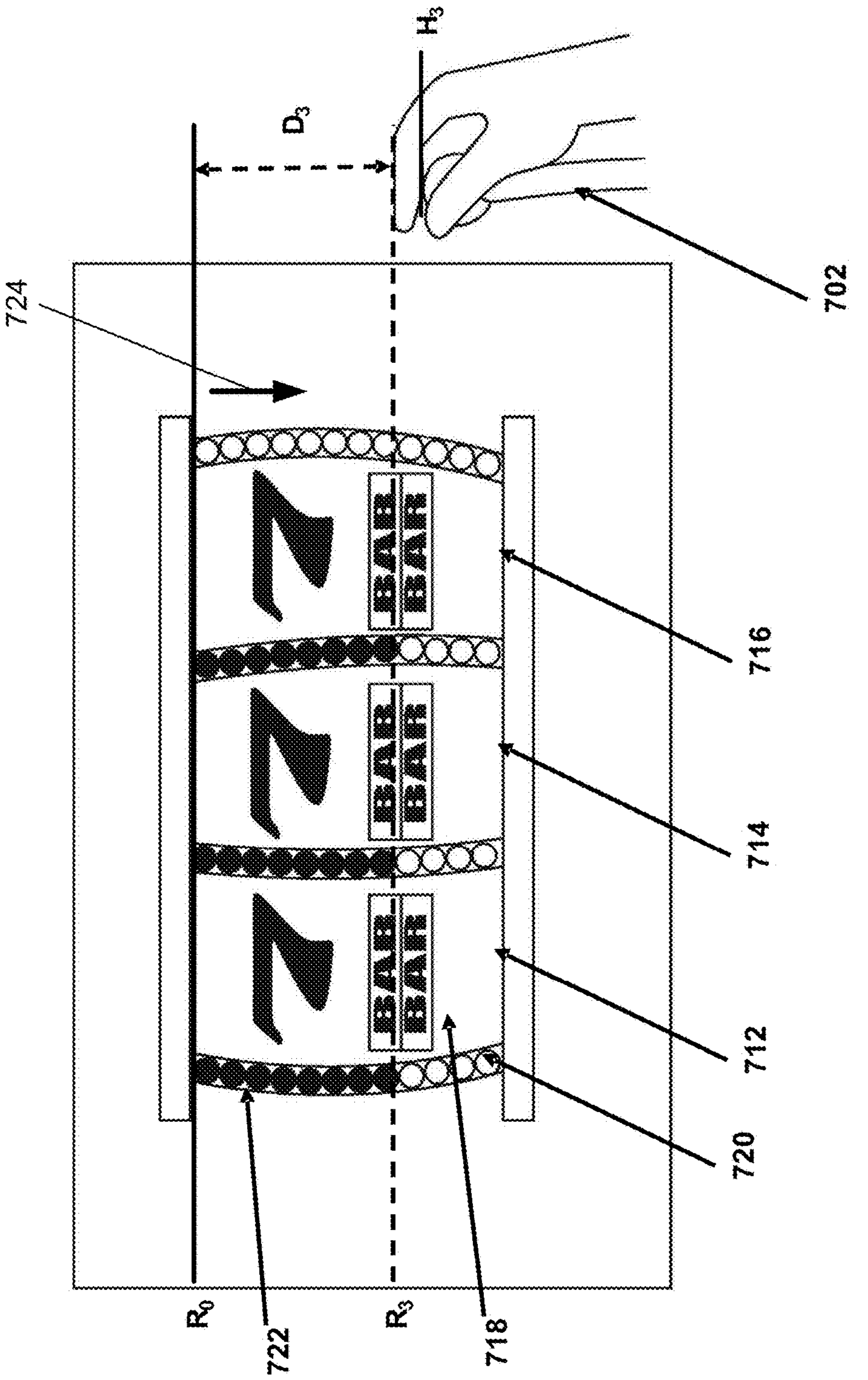
FIG. 7C illustrates a first implementation including a portion of a gaming machine with a set of reels and a controller device both moved to a third intermediate position from a second intermediate position of FIG. 7B in accordance with various implementations described herein.

FIG. 7C illustrates a portion of a gaming machine 104A-X comprising a set of reels 712, 714 and 716, and a controller device 702. The controller device 702 has moved or rocked back to a third intermediate position $H_3$ from a second intermediate position $H_2$ (shown in FIG. 7B). The set of reels 712, 714, and 716 synchronously move in the first direction 724 and symbols on reels 712, 714, 716 displaces downward, in response to the controller device 702 movement, through a variable reel displacement $D_3$ to a third reel movement line $R_3$ from the second reel movement line $R_2$ (shown in FIG. 7B). In some embodiments, light sources 722 of lighting 720 track the movement of the set of reels 712, 714, or 716 and a controller device 702 as shown in FIG. 7C. In such a case, the variable reel displacement $D_3$ is greater than the variable reel displacement $D_1$, or alternatively, the third intermediate position $H_3$ is greater than the first intermediate position $H_1$ (shown in FIG. 7A), which leads to activating more light sources 722 than those shown in FIG. 7A.

Figure 7D:
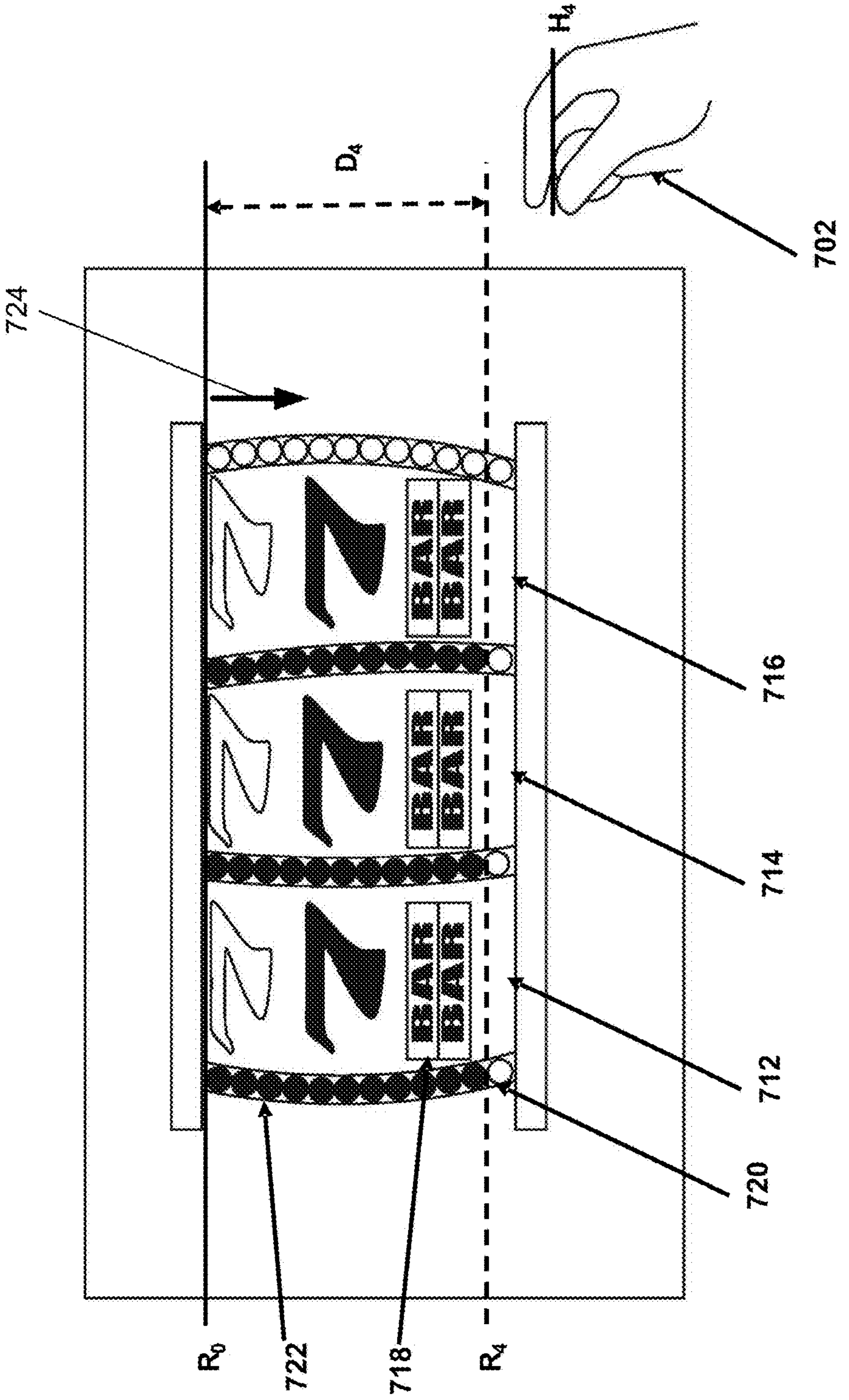
FIG. 7D illustrates a first implementation including a portion of a gaming machine with a set of reels and a controller device both moved to a trigger position in accordance with various implementations described herein.

FIG. 7D illustrates a portion of a gaming machine 104A-X comprising a set of reels 712, 714 and 716, and a controller device 702. The controller device 702 has moved to a fourth intermediate position $H_4$ from a third intermediate position $H_2$ (shown in FIG. 7C). The set of reels 712, 714, and 716 synchronously move in the first direction 724, in response to the controller device 702 movement, through a variable reel displacement $D_4$ to a fourth reel movement line $R_4$ from the third reel movement line $R_3$ (shown in FIG. 7C). In some embodiments, the light sources 722 of lighting 720 track the movement of the set of reels 712, 714, or 716 and the controller device 702 as shown in FIG. 7D. In such a case, the variable reel displacement $D_4$ is greater than the variable reel displacement $D_3$, or alternatively, the third intermediate position $H_4$ is greater than the third intermediate position $H_2$ (shown in FIG. 7C), which leads to activating more light sources 722 than those shown in FIG. 7C. In this example, the position of the controller device 702 reaches a trigger or spin position $H_4$ that may trigger the game controller 202 to actuate or to animate spinning of the set of reels 712, 714 and 716 asynchronously with respect to the motion at the input.

Figure 7E:
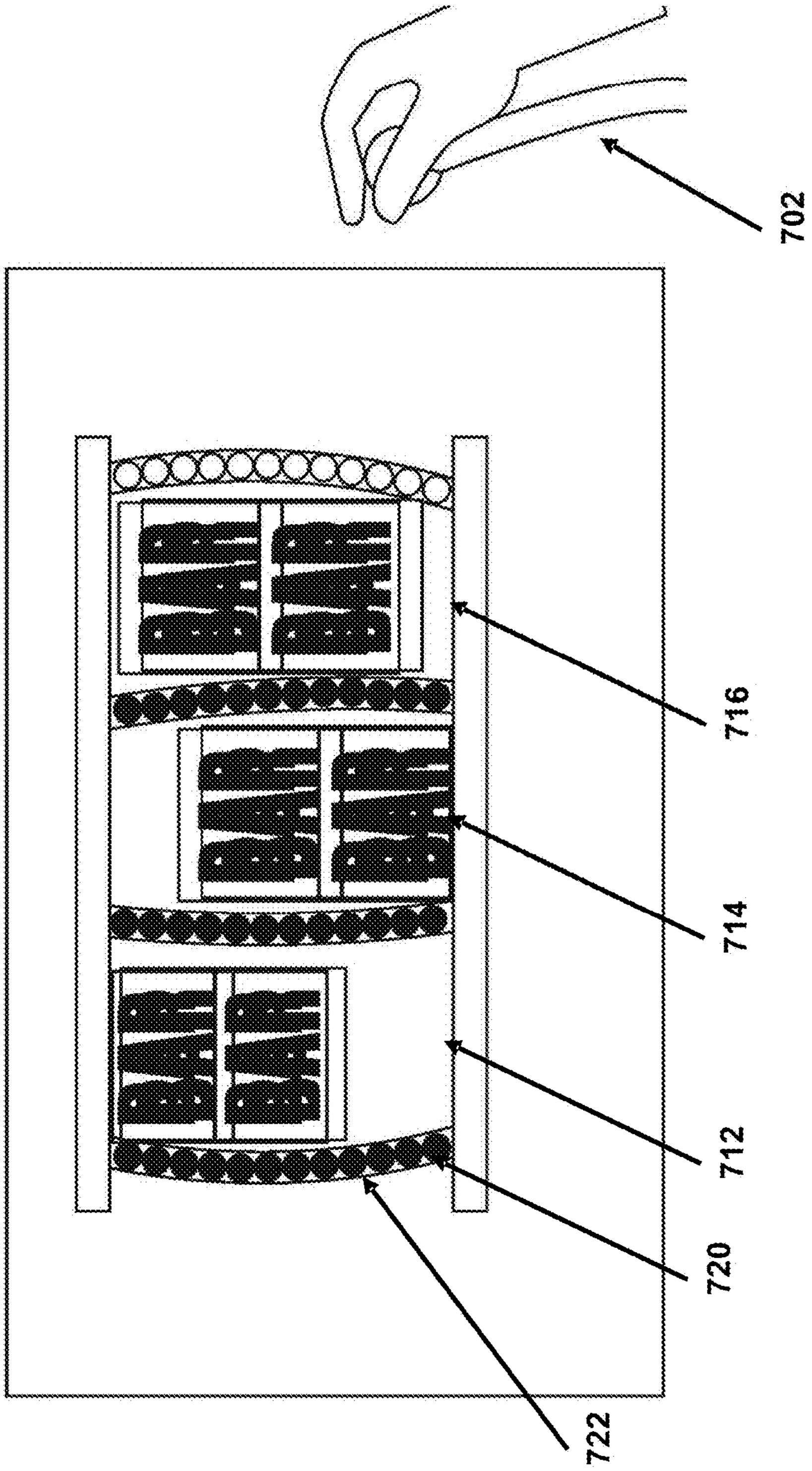
FIG. 7E illustrates a first implementation including a portion of a gaming machine with a set of reels spinning after the controller device reaches the trigger position of a first implementation in accordance with various implementations described herein.

FIG. 7E illustrates a portion of a gaming machine 104A-X comprising a set of reels 712, 714, and 716 asynchronously spinning after the controller device 702 returns, or is returned, to a starting position or home position $H_0$ from the trigger position $H_4$ in this example. The game controller 202 spins the reels 712, 714 and 716 to a stop, and an outcome is determined.

Figure 8A:
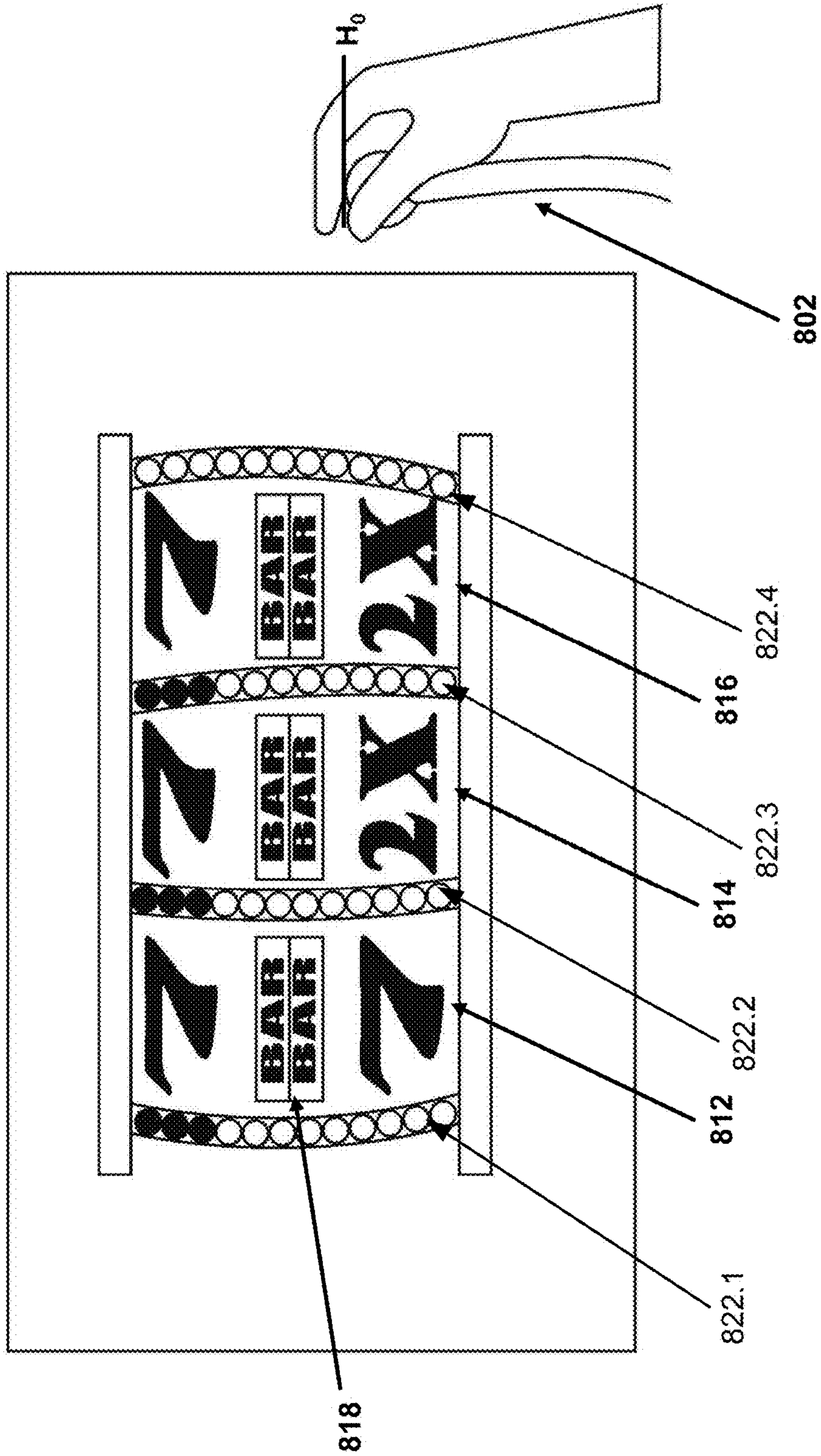
FIG. 8A illustrates a second implementation including a portion of a gaming machine with a set of reels and a controller device rests at a home position or start position.

FIGS. 8A-8F represent the second implementation. FIG. 8A illustrates a portion of a gaming machine 104A-X comprising a set of reels 812, 814, and 816 and a controller device 802 having an input (e.g., input 402 of FIG. 4). As shown in FIG. 8A, the input at the controller device 802 rests at a home position $H_0$, and all reels 812, 814, and 816 remain in place.

Figure 8B:
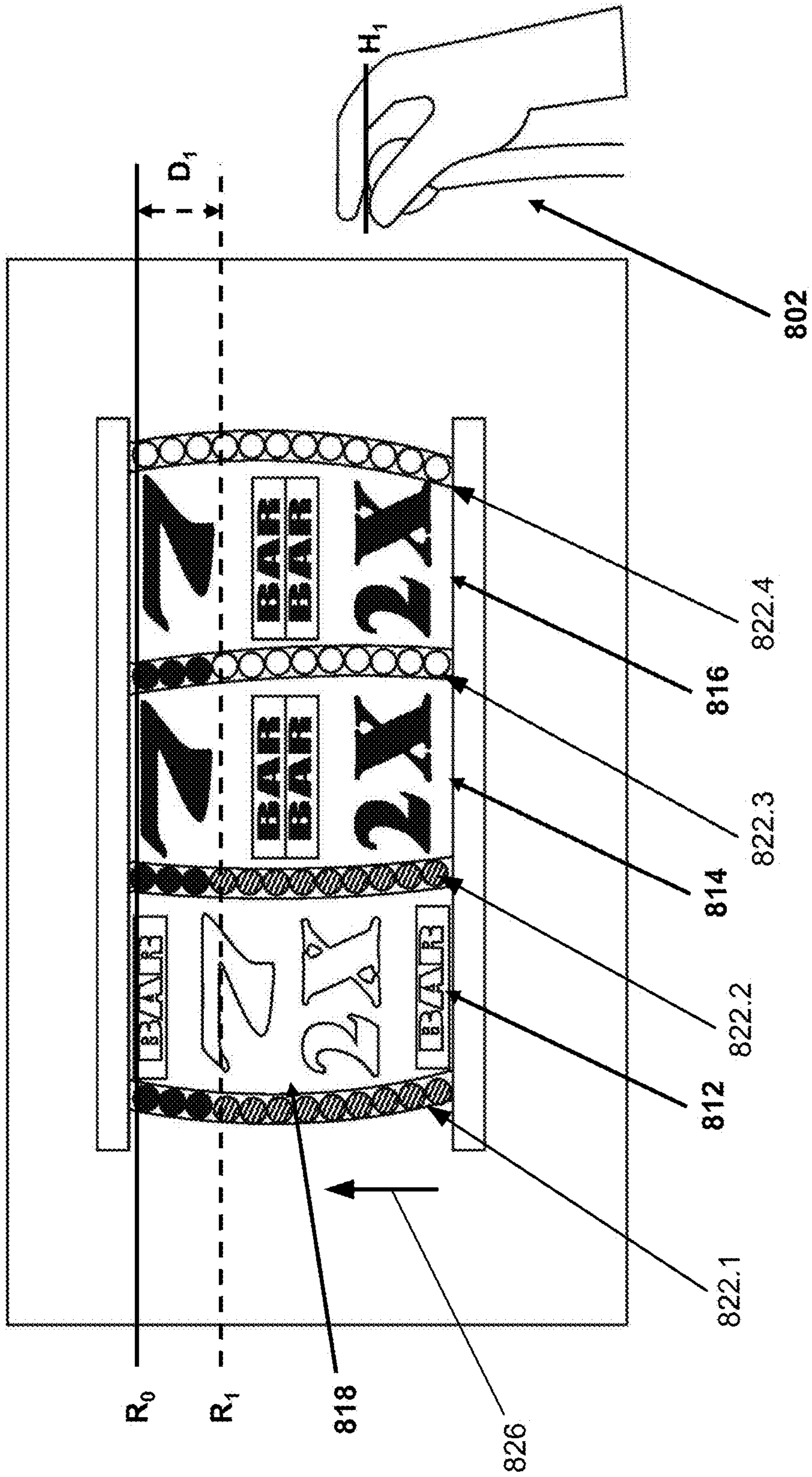
FIG. 8B illustrates a second implementation including a portion of a gaming machine with a set of reels and a controller device having been displaced to a first intermediate position in accordance with various implementations described herein.

FIG. 8B illustrates a portion of a gaming machine 104A-X comprising a set of reels 812, 814, and 816 and a controller device 802. The input or the controller device 802 has moved to a first intermediate position $H_1$ from the home position $H_0$. The reel 812 displaces or moves in an upward direction or a first direction 826 while reels 814 and reel 816 remain in place, in response to the controller device 802 movement, through a variable reel displacement $D_1$ to a first reel movement line $R_1$ from a reel reference line $R_0$. In some embodiments, activation of light sources 822.1 and 822.2 of lighting 820 track the movements of the reel 812 and the controller device 802, while light sources 822.3 and 822.4 are lit differently or not lit. As shown, symbols on reel 812 are animated or displayed differently from before the upward spin, while being displaced during the upward spin.

Figure 8C:
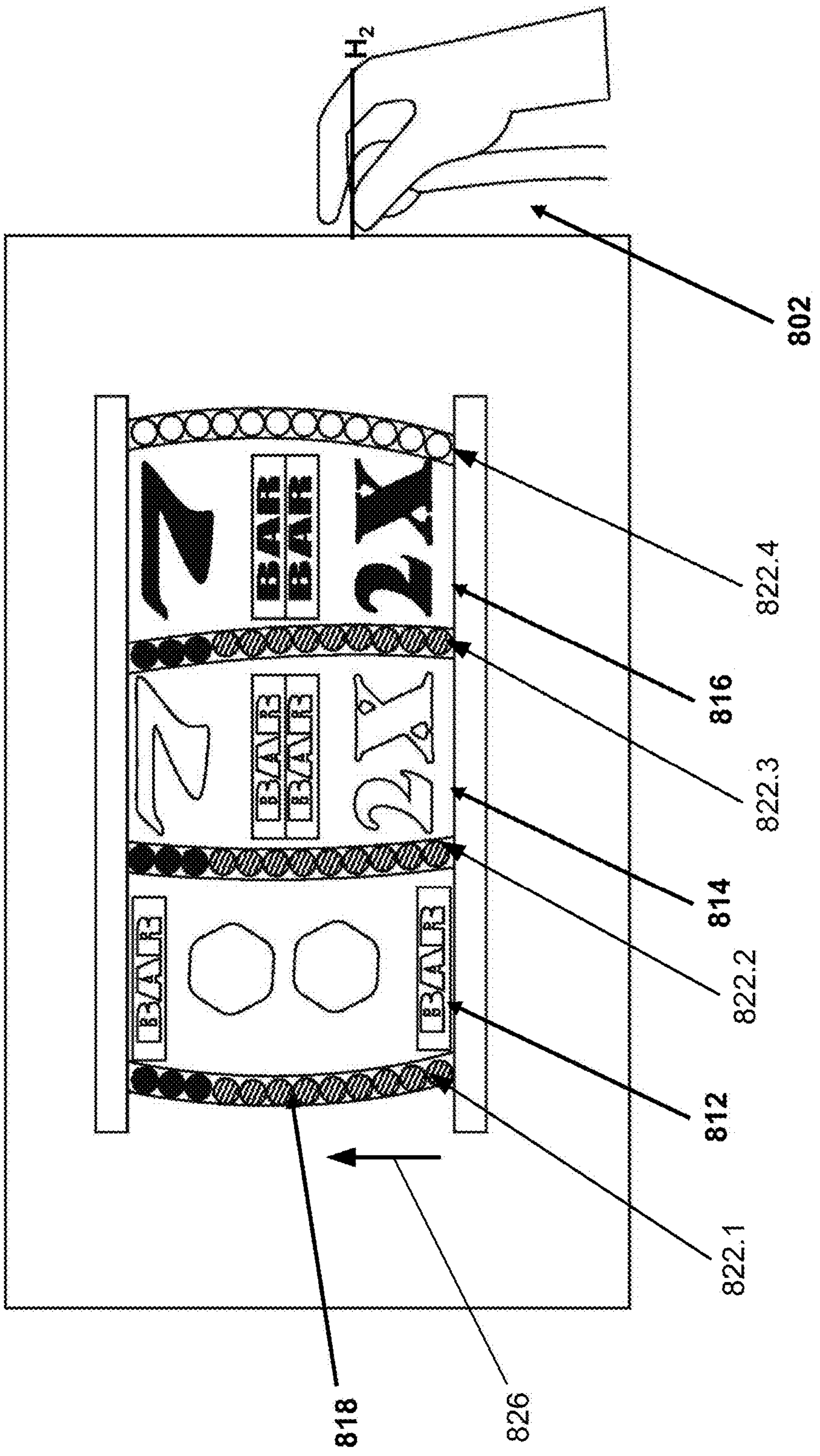
FIG. 8C illustrates a second implementation including a portion of a gaming machine with a set of reels and a controller device having been displaced to a second intermediate position in accordance with various implementations described herein.

FIG. 8C illustrates a portion of a gaming machine 104A-X comprising a set of reels 812, 814, and 816 and a controller device 802. The input or the controller device 802 is in a second intermediate position $H_2$ that initiates the movement of the second reel 814 in the first direction 826 (i.e., the movement of reels 812, 814 is upward in this illustration). Light sources 822.1, 822.2, 822.3 that surround reels 812, 814 are activated based on the movement of the input. In some embodiments, the activation of light sources 822.1, 822.2, 822.3 of lighting 820 track the movements of the reels 812, 814 and the controller device 802, while light sources 822.4 adjacent reel 816 are not lit or lit differently. In some embodiments, the reels 812, 814 may be spun synchronously, that is, spinning at the same speeds while spinning in the upward direction. In other embodiments, the reels 812, 814 may be spun asynchronously, that is, spinning at different speeds while spinning in the first direction. As shown, symbols on reels 812, 814 are animated or displayed differently from before the upward spin, while being displaced during the upward spin.

Figure 8D:
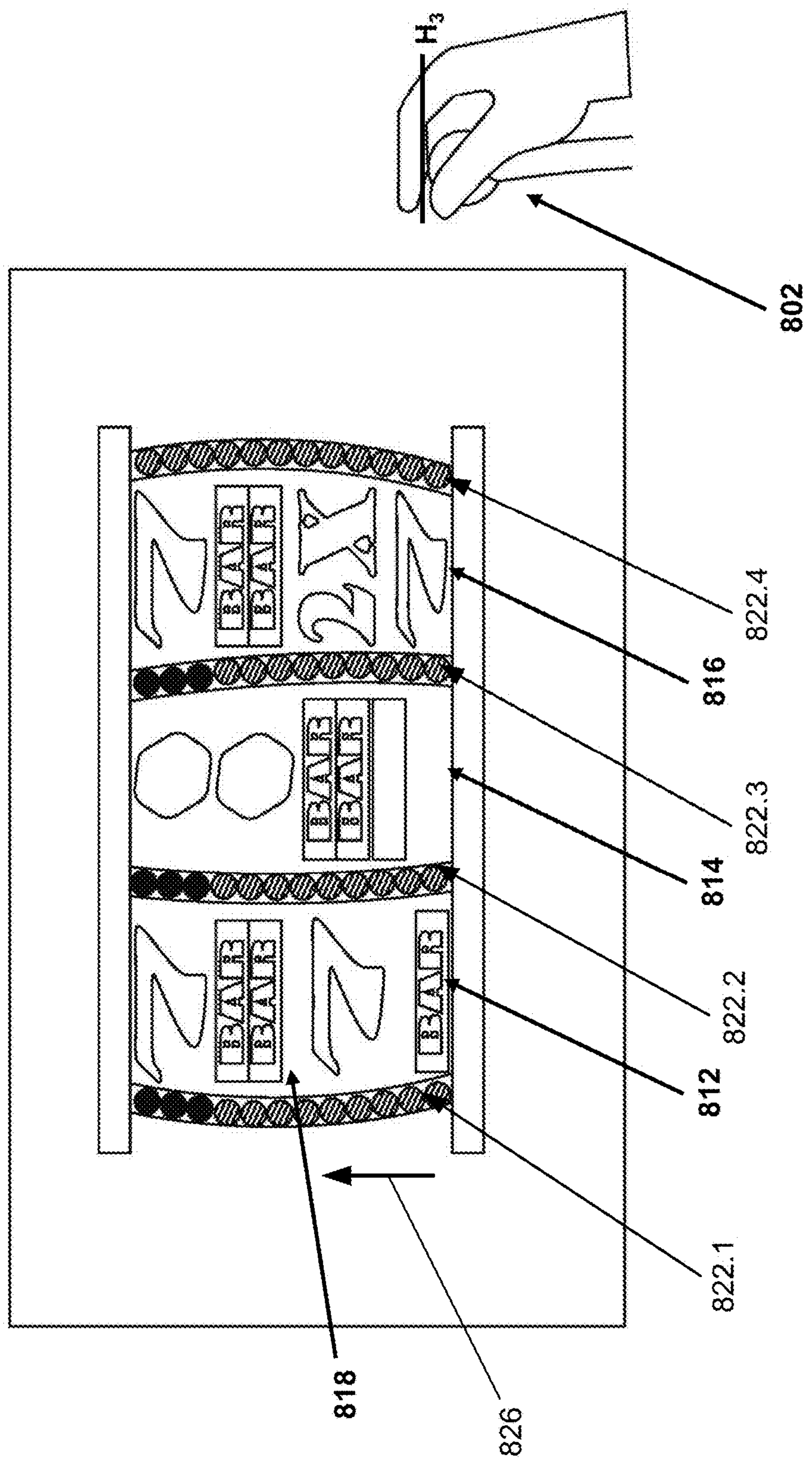
FIG. 8D illustrates a second implementation including a portion of a gaming machine with a set of reels and a controller device having been displaced to a third intermediate position in accordance with various implementations described herein.

FIG. 8D illustrates a portion of a gaming machine 104A-X comprising a set of reels 812, 814, and 816 and a controller device 802. The input or the controller device 802 is in a third intermediate position $H_3$ that initiates, while the reels 812, 814 continue to spin in the upward direction or the first direction 826, the movement of the reel 816 in the first direction. Light sources 822.1, 822.2, 822.3, 822.4 that surround reels 812, 814, 816 are activated based on the movement of the input. In some embodiments, the activation of light sources 822.1, 822.2, 822.3, 822.4 of lighting 820 track the movements of the reels 812, 814 and the controller device 802. In some embodiments, the reels 812, 814, 816 may be spun synchronously, that is, spinning at the same speeds while spinning in the upward direction. In other embodiments, the reels 812, 814, 816 may be spun asynchronously, that is, spinning at different speeds while spinning in the first direction 826. As shown, symbols on reels 812, 814, 816 are animated or displayed differently from before the upward spin, while being displaced during the upward spin.

Figure 8E:
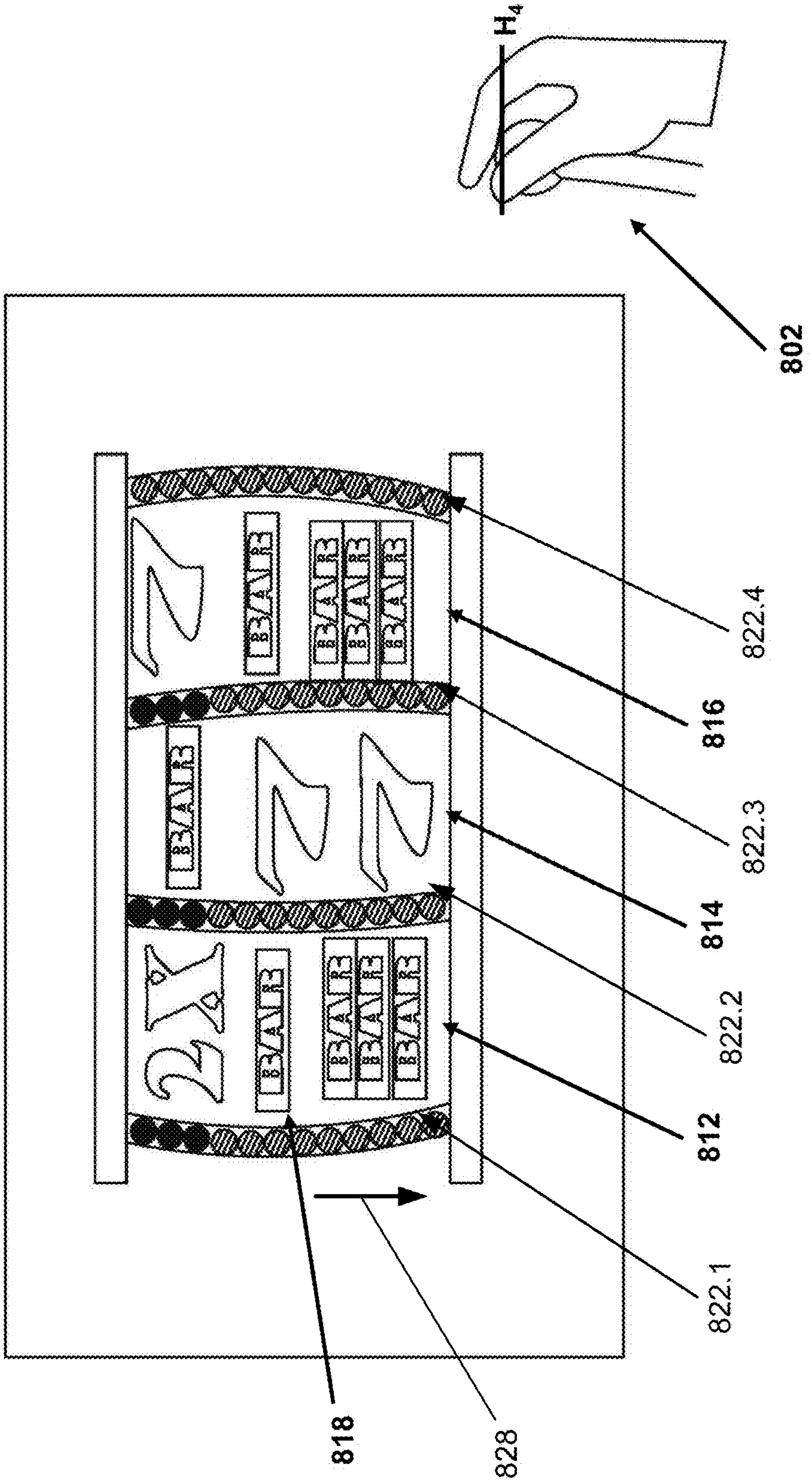
FIG. 8E illustrates a second implementation including a portion of a gaming machine with a set of reels and a controller device having been displaced to a trigger position in accordance with various implementations described herein.

FIG. 8E illustrates a portion of a gaming machine 104A-X comprising a set of reels 812, 814, and 816 and a controller device 802 having an input. The input or the controller device 802 is in a fourth intermediate position, or a trigger position $H_4$ that stops or pauses reels 812, 814, 816 from the upward spin, and triggers or initiates reels 812, 814, 816 to spin downward in a second direction 828 opposite the first direction 826. In some embodiments, reels 812, 814, 816 may begin spinning downwardly at the same spinning speed at the same time. In other embodiments, reels 812, 814, 816 may begin spinning downwardly at different spinning speeds and/or at different times. Although reels 812, 814, 816 are shown spinning upwardly before being triggered to spin downwardly in these embodiments, reels 812, 814, 816 may spin downwardly before being triggered to spin upwardly in other embodiments.

Figure 8F:
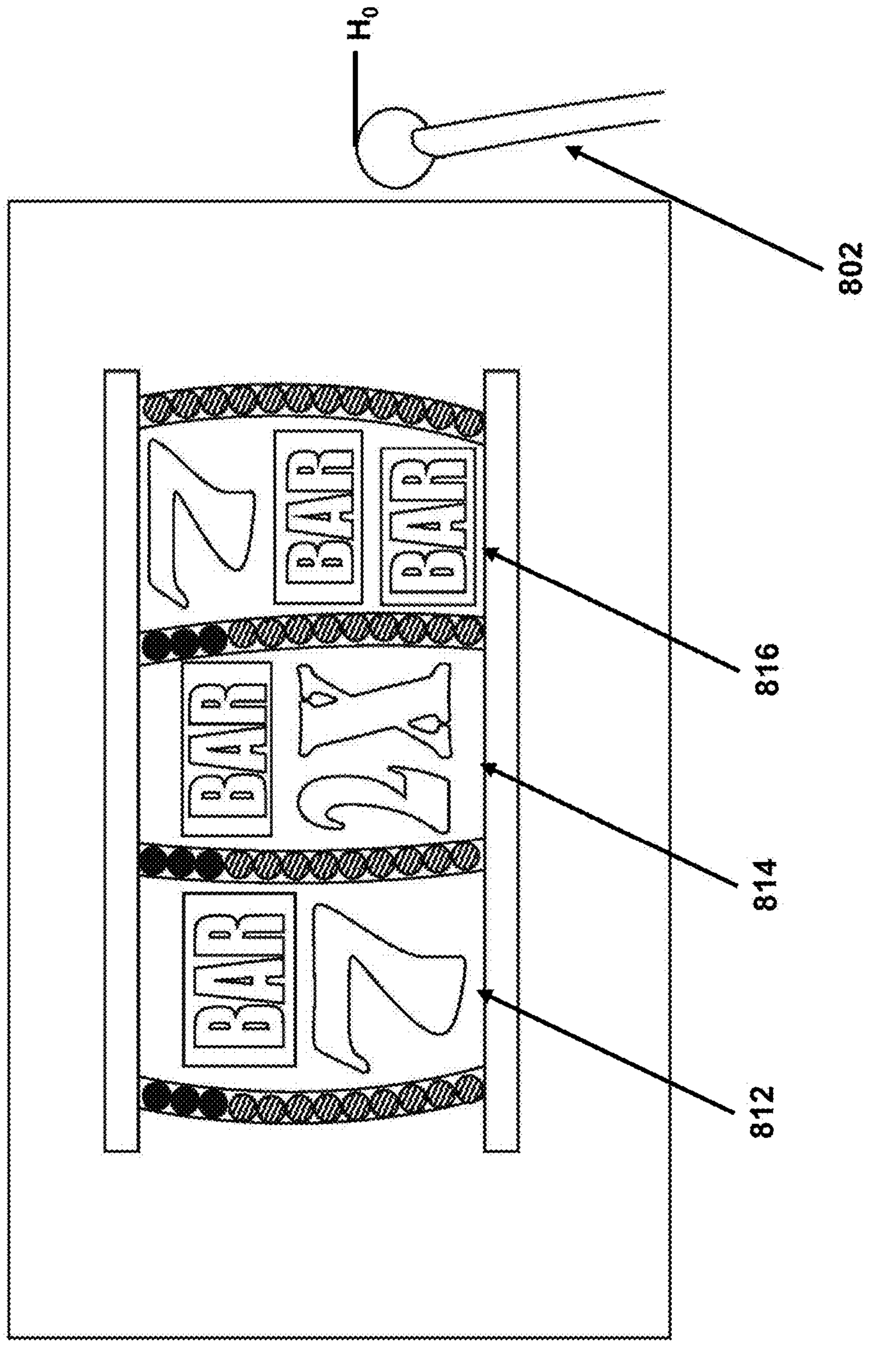
FIG. 8F illustrates a second implementation including a portion of a gaming machine with a set of reels and a controller device, where the smart device controller returns to a home position or start position in accordance with various implementations described herein.

FIG. 8F illustrates a portion of a gaming machine 104A-X comprising a set of reels 812, 814, and 816 and a controller device 802. The input or the controller device 802 returns, or is returned, to a starting position or the home position $H_0$ from the trigger position $H_5$ in this example. The game controller 202 spins the reels 812, 814 and 816 to a stop, and an outcome is animated.

Figure 9:
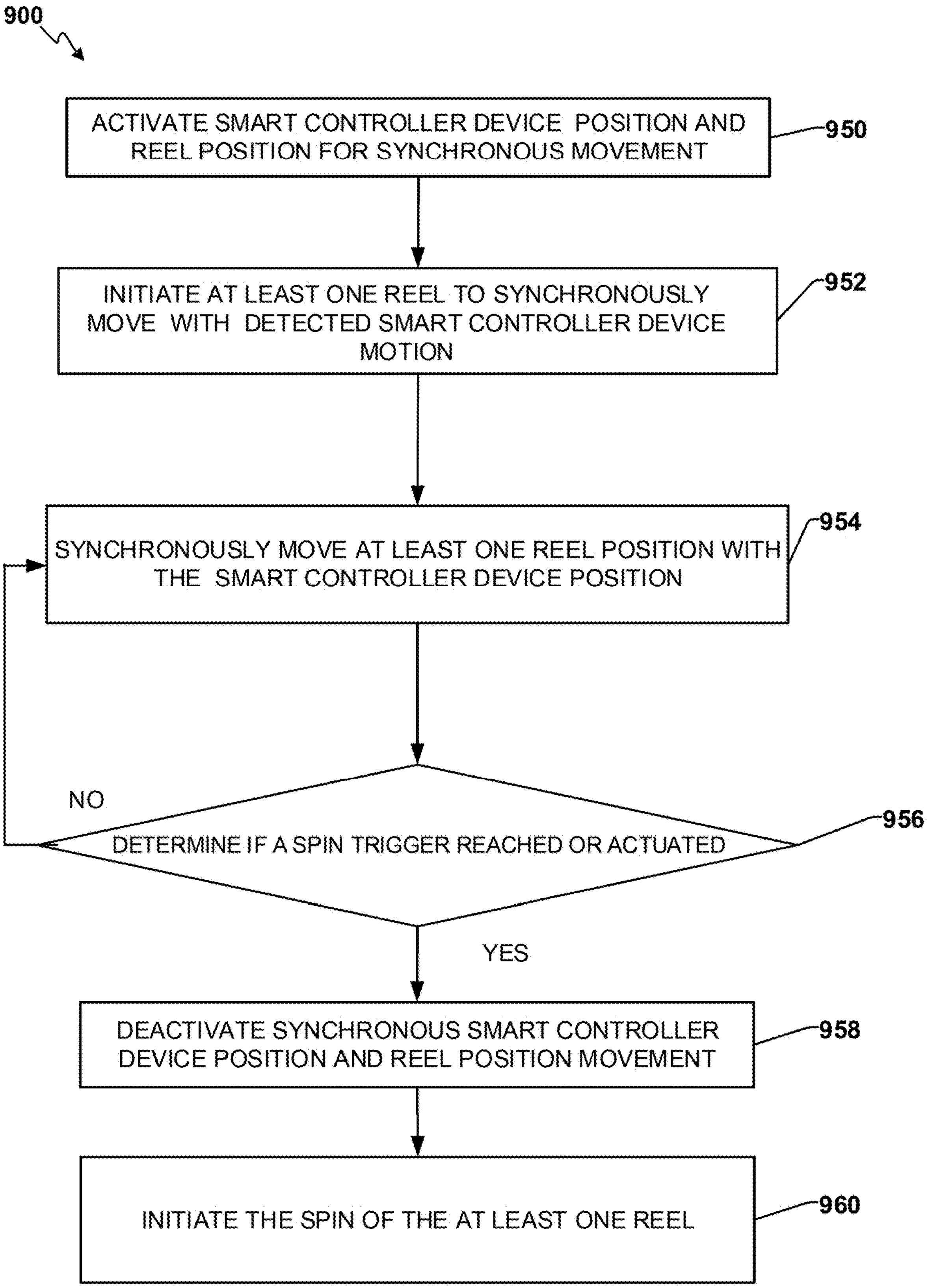
FIG. 9 illustrates a process employing a controller device in accordance with various implementations described herein.

FIG. 9 illustrates a process 900 that may be performed in a gaming device, employing a controller device 400 having an input 402 (of FIG. 4). It should also be appreciated that this implementation describes a controller device 400 but other controller devices 400 are possible and may require further steps to implement.

At block 950, when the game controller 202 receives a signal from the encoder 410 of the controller device 400 or other player interfaces, a processor 204 and a memory 208 storing programs or instructions 206 cause the process 900 to begin and activate controller device 400 to synchronize or associate with a game element, for example, a position or a symbol position of one or more reels (e.g., reels 512, 514, 516). In the embodiment shown in FIG. 5, the input 502 may register associate the home position $H_0$ with the "7" symbol on reel 512 since the "7" symbol aligns with the fixed reel reference line $R_0$.

At block 952, the game controller 202 initiates at least one reel (e.g., one of reels 512, 514, 516) to synchronously move or displace with detected controller device 400 motion via signals received from the encoder 410. The game controller 202 may also synchronize movement of the controller device 400 with other game machine features, like game light sources 524 and/or sound. At block 954, as motion of the controller device 400 is detected or communicated through the encoder 410 to the game controller 202, the game controller 202 synchronously moves or displaces the game aspect (for example, at least one reel position) to track or follow the movement of the controller device 400.

At block 956, the game controller 202 determines if a spin trigger reached or actuated. If a spin trigger is not actuated, the synchronous movement of the controller device 400 and the game element continue in a player-determined way until the spin trigger is reached or actuated. Once a spin trigger is detected, at block 958, the game controller 202 deactivates synchronous control of the controller device 400 and the game element, thus controlling the reels 512, 514, 516 to spin asynchronously from the motion. At block 960, the game controller 202 initiates the spin of the at least one reel (e.g., one of the reels 512, 514, 516).

Figure 10:
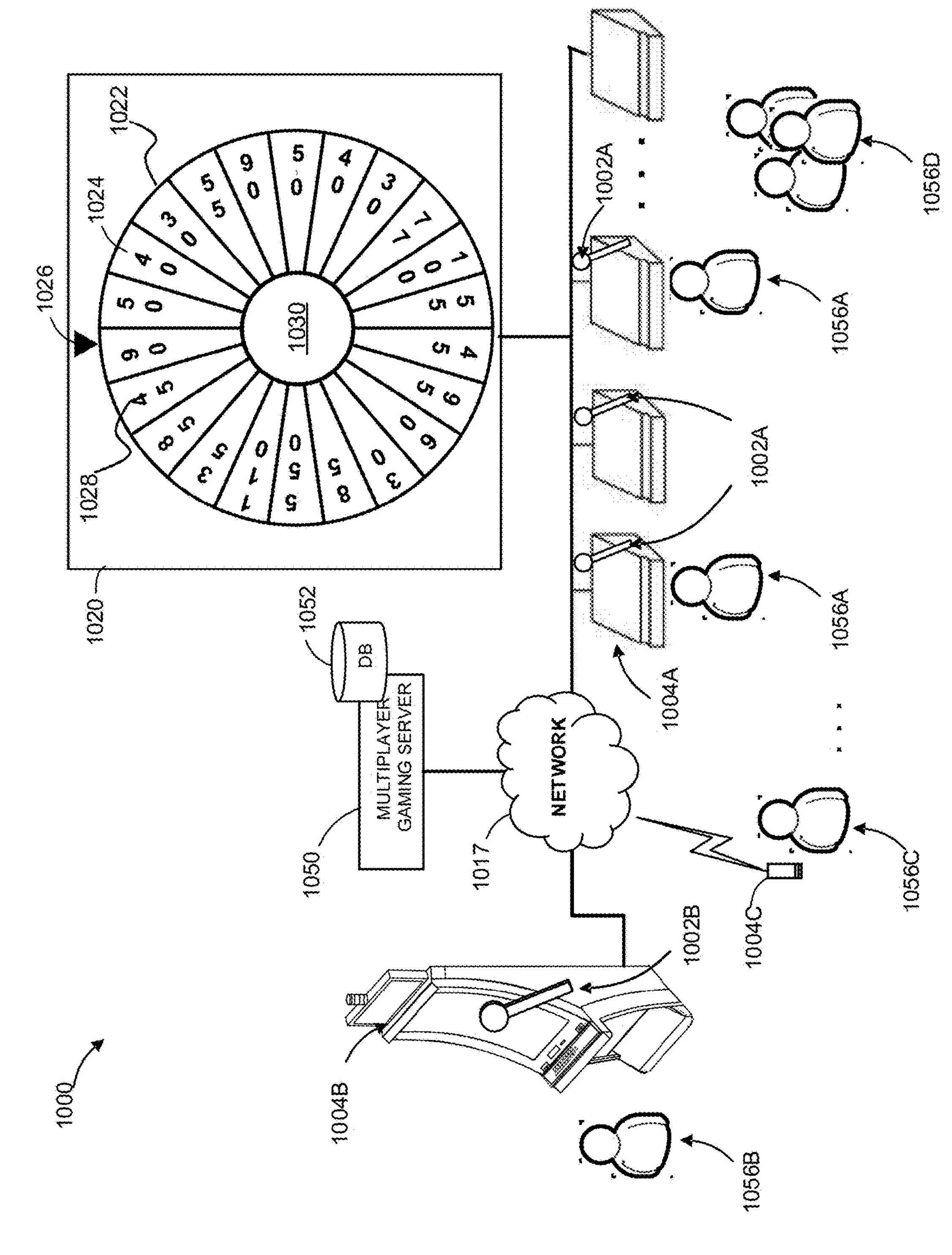
FIG. 10 illustrates a communal game arrangement employing one or more controller devices in accordance with various implementations described herein.

Now turning to FIG. 10, a controller device 400 can be employed in a variety of communal feature scenarios. A communal multiplayer electronic game (or just "communal game") may be compatible with a variety of primary game types, currency types and accessible across multiple locations. In an example embodiment, the communal game is a bonus game provided as a secondary gaming experience to players (e.g., through bar top or stand-up EGMs, mobile devices) while they are playing a primary game on those gaming devices.

Participation in the communal game may be awarded to one or more players through trigger conditions that occur within the various primary games during primary game play. For example, some players may be playing video poker and the communal game may be configured to award participation in the communal game whenever a player achieves a full house or better during a hand of video poker. Other players may be playing video black jack and the communal game may be configured to award participation in the communal game whenever the player achieves a suited black jack (e.g., Ace of hearts and King of hearts). Various types of primary games may participate in the communal game, with each type of primary game having their own trigger condition(s) for participation. As such, the players can participate in the communal game while playing a familiar game (their respective primary games), thereby both increasing machine use of the primary gaming device and augmenting a familiar experience with additional gaming experiences.

The communal game may be displayed on a communal display 1020 ("communal display") within view of some or all of the gaming devices 1004 that are participating in the communal game. In one example, a venue (e.g., a lounge, bar, tavern, restaurant, casino) is configured with numerous bar top EGMs 1004A providing a variety of electronic games, such as video poker, video slots, video black jack, video keno, and so forth. The communal display 1020 may be a large, flat-screen display device mounted within the venue and in view of some or all of the nearby primary gaming devices. The communal display 1020 shows aspects of the shared gaming experience to the primary players 1056A-C and to other nearby patrons 1056D, thereby creating shared excitement in the communal game. As players are awarded participation in the communal game, their participation is illustrated on the communal display, allowing both the awarded player to witness their participation as well as other players and bystanders to view the current status of the communal game.

More specifically, FIG. 10 illustrates a communal gaming system 1000. The communal gaming system 1000 is a networked environment 1017 in which the multiplayer gaming server 1050 provides a communal game to a variety of players 1056A-D of various participating devices 1004A-C. In this example, the communal game is a game wheel 1022 in which participating players win opportunities to spin a wheel during play of their primary games. In some embodiments, the various players 1056 may be playing using various types of currencies ("native currency" of the primary game, e.g., real currencies, virtual currencies, loyalty points, comp points, tokens, or such) and may participate in the communal game in those various currency types. Other communal games are possible in conjunction with the communal gaming system 1000.

In the example embodiment, various gaming devices 1004A-C participate in the communal game. Such gaming devices 1004A-C may include bar top gaming devices 1004A, upright gaming devices 1004B, and mobile computing devices 1004C (collectively referred to as "participating devices 1004"). The bar top gaming devices 1004A and upright gaming devices 1004B are physically networked together in network 1017, which may be similar to or otherwise include network 214. In addition, mobile computing devices 1004C may be wirelessly connected to network 1017 (e.g., via cellular network, public or private WiFi, or any such network architecture that enables aspects of the communal gaming system as described herein). In this example, bar top players 1056A are playing various primary games on the bar top gaming devices 1004A (e.g., video poker, video black jack, video slots, and such), upright players 1056B are playing various slot style primary games at upright gaming devices 1004B, and mobile players 1056C are playing various mobile primary games on mobile computing devices 1004C. Players 1056A, 1056B, 1056C may be referred to collectively herein as "players 1056" or "participating players 1056."

In the example embodiment, the communal gaming system 1000 also includes a communal display or secondary graphical user interface display device (or just "communal display") 1020. The communal display 1020 is a display device (e.g., flat screen, curved screen, projection screen) that is configured to display aspects of the communal game for public viewing, both for participating players 1056A-C as well as for other patrons and/or spectators 1056D, who, in some circumstances, may also provide collective group-based game play decisions at one or more game devices 1004A-C. In some embodiments, the communal display 1020 includes a computing server or gaming server 1050 executing a communal game client for presenting the communal game play. The communal display 1020, in this example game wheel 1022, may also present other communal game information.

Each participating gaming device 1004 provides one or more primary games that are configured to allow for participation in the communal game. For example, bar top players 1056A may be playing video poker, video keno, video black jack, video slots, or such, on the bar top devices 1004A, upright players 1056B may be playing slots on upright gaming devices 1004B, and mobile players 1056C may be playing video keno or video roulette on their mobile devices 1004C. Each type of game may be configured with one or more trigger conditions that can occur during game play to allow communal game play.

In some embodiments, the primary game may be a video slot game programmed with communal game symbols on one or more reels, and participation in the communal game may be triggered when the communal game symbol appears a pre-determined number of times in a game outcome (e.g., three communal game symbols appearing anywhere), on a pre-determined number of reels (e.g., one or more communal game symbols appearing on at least three reels), or a pre-determined number of stacks of communal game symbols (e.g., three or more reels filled with communal game symbols). As such, the primary game itself is directly configured with trigger conditions for communal game participation, and to interact with the multiplayer game server 1050 and award participation in the communal game.

In some embodiments, the primary game operates independent of the communal game but where the communal gaming system 1000 inspects results of the primary game and awards communal game participation based on certain native outcomes occurring within the primary game (e.g., based on the normal game play rules of the primary game). As such, the primary game itself need not be reprogrammed to support the communal game. Instead, the communal gaming system 1000 and associated communal game play can be overlaid onto operation of existing games.

In some embodiments, when a participating player 1056 achieves a trigger condition during primary game play, the communal gaming system 1000 awards the player 1056 with participation in the communal game. In other circumstances, when a trigger condition is detected, the gaming device 1004 transmits a communal participation trigger message to the multiplayer gaming server 1050 to begin awarding a spot on the communal display 1020 for this win event.

Upon initiation of the communal game, the multiplayer gaming server 1050 conducts game play for the current communal game cycle. In this example, the communal game play for the current game cycle includes multiple spins of the game wheel 1022 or rounds of play. A wheel animation may be displayed in the communal display 1020 (e.g., by a game client running on the multiplayer gaming server 1050, or on the gaming devices 1004 participating in the communal game). The wheel animation presents a spinning wheel 1022 that is spun by a player or players 1056 that stops at a wheel identifier that identifies the award. While game wheel 1022 animation is contemplated, it is understood that physical wheels could be employed and controlled as disclosed herein In the illustration of FIG. 10, the communal display (e.g., a secondary graphical user interface) 1020 displays, and may animate, a game wheel 1022 with a plurality of wheel slices 1024. The game wheel 1022 may be of various shapes and may include additional graphical features (e.g., a burning wheel) to enhance the communal wheel feature mode.

A wheel pointer 1026 may be displayed and/or animated along with the game wheel 1022, after the occurrence of the feature mode trigger condition, to identify a selected wheel slice 1024. In some examples of the game wheel 1022, a wheel hub display area 1030 may be included to enhance the feature mode experience through animation, emphasis and/or highlighting in the wheel hub display area 1030 information about the wheel feature mode, primary game information, game graphics, or advertising or the like.

Each wheel slice 1024 may be populated with wheel slice values 1028. These wheel slice values 1028 may be a credit value (e.g., 25 credits), a progressive or jackpot value (e.g., Major, Mini, Jackpot, etc.), a free spin value, and other discrete awards (e.g., a car), for example. The wheel slice values 1028 may also be incremented with each spin. In some embodiments, each wheel slice value 1028 may be increased on each subsequent spin to be equal to or greater than the last credit value outcome.

Several "wheel spins" may physically occur or be simulated, and the outcome(s) may be presented to the player or players 1056 via the communal display 1020 and/or the gaming devices 1004. In some examples, each "wheel spin" game outcome during the feature mode may be a winning outcome, with an associated base game award. The sum of the one or more wheel slice values 1028 may be equal to the game award (and/or sum of awards). The slice values 1028 may be highlighted and/or emphasized in animation or other graphics effects in the graphical user interface (e.g., through fireworks, explosions, color schemes, fire wheels, bolding, font size, etc.) and may be increasing with each respective spin.

To initiate wheel spins, one or more of the player or players 1056 may move a designated or eligible controller device 1002A-B in a first direction (e.g., forward), in a second direction (e.g., backward) and/or in other directions after leaving the start position, while the communal wheel 1022 tracks or follows the movement(s) of one or more controller device(s) 1002 that are designated in the communal game play. Other features, e.g. the slice values 1028 and wheel hub display area 1030, could be controlled by the controller device 400. Once the player or players 1056 decide to actuate the game wheel 1022 or upon reaching a predetermined condition, one or more player(s) 1056 or game controller 202 may initiate the designated action to spin the game wheel 1022.

Not all players require a controller device 1002 in this example. Some of the game devices 1004 may not be equipped with a controller device 1002 as illustrated by the table top game 1004A at the right. In other instances, one or more gaming devices 1004 may be equipped with a controller device 1002 but one or more of those gaming devices 1004 may have their controller devices 1002 deactivated by the multiplayer gaming server 1050 or by the game device 1004 for a given spin or round of play while one or more other controller devices 1002 remain active. That is, a player or players 1056 may not be able to have intermediate control of the game wheel 1022 prior to a spin even though the gaming device(s) 104A-X is equipped with a controller device 1002.

With each or some other combination of wheel spins, the multiplayer gaming server 1050 identifies an award for the round ("wheel spin award"). The wheel spin award for the round may be awarded to a player or players 1056 or it may be accumulated.

By way of one example, the identified player 1056 may have a communal game app or digital wallet app installed on their mobile computing device 1004C and the multiplayer gaming server 1050 may transmit a win result message to the mobile computing device 1004C indicating the win result and the transfer via the communal game app or digital wallet app. In some embodiments, the multiplayer gaming server 1050 may transmit an email or text message to one or more player(s) 1056 identified or designated. In some embodiments, the multiplayer gaming server 1050 may retain the award for later presentation to the identified player(s). For example, the multiplayer gaming server 1050 may queue the award and present the award to the player(s) when they later card into another gaming device 1004. In some embodiments, the gaming device 1004 prints out a valueless cashable coupon identifying the spot and the player(s) may redeem the coupon for the winnings they received from the spot at a later time (e.g., by presenting the coupon to the gaming device 1004).

Such exemplary scenarios using a controller device 1002 provide the player or players 1056 with actual, or at least the real perception of more control of the game element, feature and/or gaming session (e.g., when to spin a communal reel or a wheel), for example. The controller device 1002 provides precise movement, position and/or velocity, for example, information about the controller device 1002 to a game controller 202 or multiplayer game server 1050, for example, to allow the player or players 1056 the ability to synchronously control a variety of game features, elements or operations, and the ability to fine tune game element positions or operations, which could also facilitate or be used in other skilled-based games.

The present disclosure is neither a literal description of all implementations nor is it a comprehensive listing of features described herein that must be present in all implementations. To be sure, numerous implementations are described in this disclosure, and are presented for illustrative purposes only. One of ordinary skill in the art will recognize that the implementations described herein may be practiced with various modifications and alterations, such as structural, logical, software, and electrical modifications. Although particular features of the implementations described herein may be described with reference to one or more particular implementations and/or drawings, it should be understood that such features are not limited to usage in the one or more particular implementations or drawings with reference to which they are described, unless expressly specified otherwise.

For the sake of presentation, the detailed description and claims may use terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

In the claims which follow and in the preceding description, except where the context requires otherwise due to express language or necessary implication, the word "comprise" or variations such as "comprises" or "comprising" is used in an inclusive sense—e.g., to specify the presence of the stated features but not to preclude the presence or addition of further features in various implementations contemplated herein.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g., an electrically erasable programmable read-only memory (EEPROM), (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

an input being movable between a first input position and a second input position;

an encoder coupled to the input and operable to detect a displacement of the input from the first input position;

a display device operable to display a reel having a plurality of symbol positions, the reel being controllably moveable in a first direction and a second direction, and a first symbol position of the plurality of symbol positions being associated with the first input position; and a controller having a processor and memory storing a plurality of instructions, which, when executed, cause the processor to at least:

receive from the encoder a first signal indicative of a first input displacement of the input from the first input position toward the second input position, responsive to receiving the first signal, control the display device to animate a movement of the reel in the first direction displacing the first symbol position while synchronously tracking the first input displacement, receive from the encoder a second signal indicative of a second input displacement of the input subsequent to the first input displacement reaching the second input position, and responsive to receiving the second signal, control the display device to animate a spinning of the reel in the first direction asynchronously with the second input displacement.

2. The electronic gaming device of claim 1, wherein the input comprises at least one of a button, a thumb stick, a directional pad, a touch pad, a paddle handle, an arm, a dial, a slide, and a lever.

3. The electronic gaming device of claim 1, wherein the input comprises a variable position lever having one of multi-directional single-axis movements and multi-directional multi-axis movements.

4. The electronic gaming device of claim 1, wherein the first signal includes at least one of a position, a direction, a velocity, an absolute value, a relative value, and an incremental value of the first input displacement.

5. The electronic gaming device of claim 1, wherein the encoder is operable to sense at least one of a rotational angle and linear displacement of the input.

6. The electronic gaming device of claim 1, wherein the movement is a first movement, and wherein one or more of the plurality of instructions, when executed, further cause the processor to animate a second movement of the reel opposite the first movement when the input moves from an intermediate position between the first input position and the second input position back toward the first input position before reaching the second input position.

7. The electronic gaming device of claim 6, wherein one or more of the plurality of instructions, when executed, further cause the processor to animate the second movement synchronously tracking the input.

8. A method of controlling spinning of a reel in an electronic gaming device having an input being movable between a first input position and a second input position, an encoder coupled to the input and operable to detect a displacement of the input from the first input position, a display device operable to display the reel, the reel having a plurality of symbol positions and being controllably moveable in a first direction and a second direction, and a first symbol position of the plurality of symbol positions being associated with the first input position, and a game controller having a processor and memory storing a plurality of instructions, which, when executed, cause the processor to at least initiate a game, the method comprising:
- transmitting from the encoder a first signal indicative of a first input displacement of the input from the first input position toward the second input position;
- animating on the display device the first symbol position displacing in the first direction while synchronously tracking the first input displacement, responsive to receiving the first signal;
- transmitting from the encoder a second signal indicative of a second input displacement of the input subsequent to the first input displacement reaching the second input position; and
- animating on the display device the reel spinning in the first direction asynchronously with the second input displacement, responsive to receiving the second signal.

9. The method of claim 8, wherein the input comprises at least one of a button, a thumb stick, a directional pad, a touch pad, a paddle handle, an arm, a dial, a slide, and a lever.

10. The method of claim 8, wherein the input comprises a variable position lever having one of multi-directional single-axis movements and multi-directional multi-axis movements.

11. The method of claim 8, wherein the first signal includes at least one of a position, a direction, a velocity, an absolute value, a relative value, and an incremental value of the first input displacement.

12. The method of claim 8, further comprising the encoder sensing at least one of a rotational angle and linear displacement of the input.

13. The method of claim 8, wherein the displacing is a first displacing, and further comprising animating a second displacing of the reel opposite the first displacing when the input moves from an intermediate position between the first input position and the second input position back toward the first input position before reaching the second input position, while synchronously tracking the input moving back to the first input position.

14. A non-transitory computer-readable medium storing a plurality of instructions for controlling spinning of a reel having a plurality of symbol positions in an electronic gaming device having an input being movable between a first input position and a second input position, an encoder coupled to the input and operable to detect a displacement of the input from the first input position, a display device operable to display at least a portion of the reel, the reel being controllably moveable in a first direction and a second direction, and a first symbol position of the plurality of symbol positions being associated with the first input position, and a game controller having a processor, the instructions, which, when executed, cause one or more processors to perform the steps of:
- detecting at the encoder a first input displacement of the input from the first input position toward the second input position;
- animating on the display device the first symbol position displacing in the first direction while synchronously tracking the first input displacement, responsive to the encoder detecting the first input displacement;
- detecting at the encoder a second input displacement of the input subsequent to the first input displacement reaching the second input position; and
- animating on the display device the reel spinning in the first direction asynchronously with the second input displacement, responsive to the encoder detecting the second input displacement.

15. The non-transitory computer-readable medium of claim 14, wherein the input comprises at least one of a button, a thumb stick, a directional pad, a touch pad, a paddle handle, an arm, a dial, a slide, and a lever.

16. The non-transitory computer-readable medium of claim 14, wherein the input comprises a variable position lever having one of multi-directional single-axis movements and multi-directional multi-axis movements.

17. The non-transitory computer-readable medium of claim 14, and wherein one or more of the plurality of instructions, when executed, further cause the encoder to perform the step of detecting at least one of a position, a direction, a velocity, an absolute value, a relative value, and an incremental value of the first input displacement.

18. The non-transitory computer-readable medium of claim 14, wherein the encoder is operable to sense at least one of a rotational angle and linear displacement of the input.

19. The non-transitory computer-readable medium of claim 14, wherein one or more of the plurality of instructions, when executed, further cause the processor to perform the step of animating the first symbol position displacing in the second direction opposite the first direction when the input moves back toward the first input position before reaching the second input position.

20. The non-transitory computer-readable medium of claim 19, wherein one or more of the plurality of instructions, when executed, further cause the processor to perform the step of animating the first symbol position displacing in the second direction while synchronously tracking the input moving back to the first input position.

* * * * *